US010788120B2

(12) United States Patent  
Yamakawa et al.

(10) Patent No.: US 10,788,120 B2  
(45) Date of Patent: Sep. 29, 2020

(54) AUTOMATIC TRANSMISSION

(71) Applicant: Mazda Motor Corporation, Aki-gun, Hiroshima (JP)

(72) Inventors: Shota Yamakawa, Hiroshima (JP); Tatsuhiko Iwasaki, Hiroshima (JP); Tomotaka Ishizaka, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 94 days.

(21) Appl. No.: 16/260,393

(22) Filed: Jan. 29, 2019

(65) Prior Publication Data

US 2019/0283719 A1    Sep. 19, 2019

(30) Foreign Application Priority Data

Mar. 15, 2018    (JP) .................................. 2018-047476

(51) Int. Cl.
*F16H 57/04* (2010.01)
*F16H 57/10* (2006.01)
*F16H 3/66* (2006.01)
*F16H 63/30* (2006.01)

(52) U.S. Cl.
CPC ..... *F16H 57/0473* (2013.01); *F16H 57/0484* (2013.01); *F16H 3/663* (2013.01); *F16H 57/10* (2013.01); *F16H 2063/303* (2013.01); *F16H 2200/006* (2013.01); *F16H 2200/2012* (2013.01); *F16H 2200/2043* (2013.01)

(58) Field of Classification Search
CPC ... F16H 57/0484; F16H 57/0473; F16H 57/10
See application file for complete search history.

(56) References Cited

U.S. PATENT DOCUMENTS

| 9,022,894 | B2* | 5/2015 | Goleski | F16D 25/10 |
| | | | | 475/279 |
| 9,145,966 | B2* | 9/2015 | Frait | F16H 57/0441 |
| 9,194,482 | B2* | 11/2015 | Goleski | F16H 63/3026 |
| 9,328,779 | B2* | 5/2016 | Goleski | F16D 48/0206 |
| 9,989,127 | B2* | 6/2018 | Kamada | F16H 3/666 |
| 10,082,202 | B2* | 9/2018 | Iwasaki | F16H 57/0484 |

(Continued)

FOREIGN PATENT DOCUMENTS

JP    201690048 A    5/2016

*Primary Examiner* — David R Morris
(74) *Attorney, Agent, or Firm* — Alleman Hall Creasman & Tuttle LLP

(57) ABSTRACT

An automatic transmission is provided with a friction engaging element having a hub member, a drum member, friction plates disposed between the hub member and the drum member, and a piston configured to engage the friction plates. The hub member includes a first hub member made of ferrous material and having a cylindrical part provided with a spline part, the friction plates being spline-engaged with the spline part, and a second hub member made of aluminum-based material, disposed at a side part of the first hub member, and having a feed part for lubrication provided with a supply oil channel configured to supply hydraulic fluid for lubrication to the friction plates. A notch for lubrication is formed by circumferentially cutting the cylindrical part of the first hub member corresponding to the feed part of the second hub member. The feed part supplies the hydraulic fluid for lubrication through the notch.

4 Claims, 21 Drawing Sheets

(56) References Cited

U.S. PATENT DOCUMENTS

| | | | |
|---|---|---|---|
| 10,184,556 B2* | 1/2019 | Iwasaki | F16H 63/3026 |
| 2014/0090944 A1* | 4/2014 | Goleski | F16H 57/0484 |
| | | | 192/3.33 |
| 2014/0105728 A1* | 4/2014 | Frait | F16H 57/0441 |
| | | | 415/122.1 |
| 2014/0113762 A1* | 4/2014 | Goleski | F16D 48/0206 |
| | | | 475/279 |
| 2016/0069398 A1* | 3/2016 | Goleski | F16D 48/0206 |
| | | | 475/116 |
| 2016/0281836 A1* | 9/2016 | Iwasaki | F16H 57/0484 |
| 2017/0073790 A1* | 3/2017 | Sabo | C21D 9/32 |
| 2017/0276235 A1* | 9/2017 | Iwasaki | F16H 57/0427 |
| 2017/0284516 A1* | 10/2017 | Kamada | F16H 3/663 |
| 2018/0340605 A1* | 11/2018 | Nishioka | F16H 57/0473 |
| 2019/0257370 A1* | 8/2019 | Yamakawa | F16H 3/62 |
| 2019/0257371 A1* | 8/2019 | Yamakawa | F16H 57/10 |
| 2019/0257376 A1* | 8/2019 | Yamakawa | F16D 25/0638 |
| 2019/0285167 A1* | 9/2019 | Yamakawa | F16H 57/0473 |
| 2019/0285174 A1* | 9/2019 | Yamakawa | F16H 63/3026 |

* cited by examiner

|  | CL1 | CL2 | CL3 | BR1 | BR2 |
|---|---|---|---|---|---|
| 1ST GEAR | ○ |  |  | ○ | ○ |
| 2ND GEAR |  | ○ |  | ○ | ○ |
| 3RD GEAR | ○ | ○ |  |  | ○ |
| 4TH GEAR |  | ○ | ○ |  | ○ |
| 5TH GEAR | ○ |  | ○ |  | ○ |
| 6TH GEAR | ○ | ○ | ○ |  |  |
| 7TH GEAR | ○ |  | ○ | ○ |  |
| 8TH GEAR |  | ○ | ○ | ○ |  |
| REVERSE GEAR |  |  | ○ | ○ | ○ |

FIG. 2

AUTOMATIC TRANSMISSION

TECHNICAL FIELD

The present disclosure relates to an automatic transmission mounted on a vehicle, and belongs to a technical field of the automatic transmission for vehicles.

BACKGROUND OF THE DISCLOSURE

It is generally known that automatic transmissions mounted on vehicles may include a hydraulic power transmission device such as a torque converter, coupled to a driving source such as an engine, and a transmission mechanism coupled to the hydraulic power transmission device and provided with a plurality of planetary gear sets (planetary gear mechanisms) and a plurality of friction engaging elements, such as clutches and brakes. The plurality of friction engaging elements are selectively engaged by a hydraulic control to achieve a plurality of gear positions with different gear ratios.

In recent years, there is a tendency to eliminate the hydraulic power transmission device because of the desire for an increasing number of gear positions, and a reduction of the weight, etc., of the automatic transmission. In this case, it is possible to realize a smooth start of traveling by carrying out a slip control of at least one of the friction engaging elements which is engaged at a first gear when the vehicle starts traveling, while avoiding an engine stall.

When carrying out the slip control of the friction engaging element engaged at the first gear when the vehicle starts traveling, since the brake that causes the hydraulic chamber not to rotate is better in controllability at the time of the engagement than the clutch which causes the hydraulic chamber to rotate, it is possible to carry out slip control of the brake engaged at the first gear when the vehicle starts traveling.

In an automatic transmission structured in this way, since the frequency of executing the slip control increases for the brake engaged at the first gear when the vehicle starts traveling, it is necessary to effectively reduce a generation of heat from a friction plate due to the slip control in order to secure necessary durability.

In order to reduce the generation of heat from the friction plate, it is possible to increase the quantity of the hydraulic fluid for lubrication supplied to the friction plate to improve the cooling capability. However, in a brake in which a plurality of friction plates are disposed between an inner circumferential surface of the transmission case and an outer circumferential surface of a given rotary member accommodated in the transmission case, there is a possibility that hydraulic fluid for lubrication stagnates near the inner circumferential surface of the transmission case to cause drag between the friction plates that increases the rotational resistance.

On the other hand, for example, JP2016-090048A discloses a brake which is engaged at the first gear and is slip-controlled when the vehicle starts traveling. In this brake, a plurality of friction plates are disposed between an outer circumferential surface of a hub member coupled to a transmission case and an inner circumferential surface of a drum member coupled to a given rotary member.

FIG. 21 is a cross-sectional view illustrating a brake of a conventional automatic transmission. As illustrated in FIG. 21, a brake 200 includes a hub member 202 coupled to a transmission case 201, a drum member 204 coupled to a given rotary member 203, a plurality of friction plates 205 disposed between the hub member 202 and the drum member 204, and a piston 206 which engages the plurality of friction plates 205.

In the brake 200, a supply oil channel 207 for lubrication extends, as indicated by an arrow 208, radially inward of the transmission case 201 through the inside of a coupling member 209 coupled to the transmission case 201 and extends from one side in the axial directions to the other side through a spline part 210 formed in an outer circumferential surface of the hub member 202, to supply hydraulic fluid for lubrication to the plurality of friction plates 205.

The hydraulic fluid for lubrication receives a centrifugal force of the friction plates 205 which are spline-engaged with the drum member 204, and then, as indicated by an arrow 211, moves radially outwardly, and is supplied between the friction plates 205, to cool the friction plates 205 heated by the slip control. Then, the hydraulic fluid for lubrication which moved to an inner circumferential surface of the drum member 204 is prevented from, as indicated by an arrow 212, moving outward in the axial directions and stagnating by the rotation of the drum member 204.

In the brake disclosed in JP2016-090048A, as illustrated in FIG. 21, since the hydraulic fluid for lubrication is moved from one side in the axial directions to the other side through the spline part 210 formed in the outer circumferential surface of the hub member 202, the hydraulic fluid for lubrication may outflow radially outwardly as indicated by an arrow 213 before reaching the friction plates 205 to cause a reduction in the cooling efficiency of the friction plates 205.

On the other hand, inside the hub member, by forming the supply oil channel for lubrication so as to extend axially, and by providing a supply port and an introduction port in a part where the friction plates are disposed and a part where the coupling member is disposed, respectively, the hydraulic fluid for lubrication can efficiently be supplied to the friction plates to improve the cooling efficiency of the friction plates.

In order to reduce the weight, the hub member of the brake may be formed by using an aluminum-based material. However, since a spline part with which the friction plates are spline-engaged needs to secure a given strength for receiving a force inputted from the friction plates when engaging the brake, the tooth length of the spline part may increase to increase the radial dimension. In addition, if a supply oil channel for lubrication is formed in the hub member and the hydraulic fluid for lubrication is supplied from the hub member, the radial dimension of the hub member may further increase.

Thus, in an automatic transmission provided with the brake where the plurality of friction plates are disposed between the hub member and the drum member, the automatic transmission needs to be compact in the radial dimension in order to be mounted to a limited internal space of a vehicle. However, if the hub member is provided with a spline part with which the friction plates are spline-engaged, and the supply oil channel for lubrication is formed by using an aluminum-based material, the radial dimension may increase.

Similarly, in an automatic transmission provided with a clutch where the plurality of friction plates are disposed between the hub member and the drum member, if the hub member provided with the spline part with which the friction plates are spline-engaged, and the supply oil channel for lubrication is formed by using aluminum-based material, the radial dimension may increase.

SUMMARY OF THE DISCLOSURE

Therefore, one purpose of the present disclosure is to provide an automatic transmission provided with a friction engaging element where a plurality of friction plates are disposed between a hub member and a drum member, which can supply hydraulic fluid for lubrication from the hub member, while reducing the radial size and the weight.

According to one aspect of the present disclosure, an automatic transmission is provided with a friction engaging element having a hub member, a drum member, a plurality of friction plates disposed between the hub member and the drum member, and a piston configured to engage the plurality of friction plates. The hub member includes a first hub member having a cylindrical part provided with a spline part, and is made of a ferrous material, the friction plates being spline-engaged with an outer circumferential part of the spline part, and a second hub member disposed at a side part of the first hub member, having a feed part for lubrication provided with a supply oil channel for lubrication configured to supply hydraulic fluid for lubrication to the friction plates from an inner circumferential side, and is made of an aluminum-based material. A notch for lubrication is formed by circumferentially cutting the cylindrical part of the first hub member corresponding to the feed part for lubrication of the second hub member. The feed part for lubrication supplies the hydraulic fluid for lubrication to the friction plates through the notch for lubrication.

According to this configuration, since the first hub member having the cylindrical part with the spline part is made of the ferrous material, the tooth height of the spline part can be reduced as compared with the case where the hub member having the cylindrical part with the spline part and the feed part for lubrication provided with the supply oil channel for lubrication is made of the aluminum-based material, thereby reducing the radial size.

Moreover, since the second hub member having the feed part for lubrication with the supply oil channel for lubrication is made of the aluminum-based material, while supplying the hydraulic fluid for lubrication from the hub member side, the weight can be reduced as compared with the case where the hub member having the cylindrical part with the spline part and the feed part for lubrication is made of the ferrous material.

Therefore, in the automatic transmission provided with the friction engaging element where the plurality of friction plates are disposed between the hub member and the drum member, the weight and the radial size can be reduced while supplying the hydraulic fluid for lubrication from the hub member side.

The friction engaging element may be a brake where the hub member is coupled to a transmission case, and the drum member is coupled to a given rotary member.

According to this configuration, the friction engaging element is a brake where the hub member is coupled to the transmission case and the drum member is coupled to the given rotary member. Thus, in the automatic transmission provided with the brake where the plurality of friction plates are disposed between the hub member and the drum member, the weight and the radial size can be reduced while supplying the hydraulic fluid for lubrication from the hub member side.

The automatic transmission may include a hydraulic chamber to which hydraulic fluid for biasing the piston is supplied. The second hub member may be provided with a supply oil channel for operation configured to supply the hydraulic fluid to the hydraulic chamber.

According to this configuration, the hydraulic chamber to which the hydraulic fluid for biasing the piston is provided, and the supply oil channel for operation which supplies the hydraulic fluid to the hydraulic chamber is provided to the second hub member. Thus, since the supply oil channel for lubrication and the supply oil channel for operation are formed in the second hub member, the supply oil channels of the hydraulic fluid can be simplified, as compared with a case where the supply oil channel for lubrication and the supply oil channel for operation are formed in the first hub member and the second hub member.

The automatic transmission may be coupled to a driving source without an intervening hydraulic power transmission device. The friction engaging element may be slip-controlled when a vehicle starts traveling, and is engaged at the first gear.

According to this configuration, the automatic transmission is coupled to the driving source without the intervening hydraulic power transmission device, and the friction engaging element is slip-controlled when the vehicle starts traveling and is engaged at the first gear. Thus, in the automatic transmission coupled to the driving source without the intervening hydraulic power transmission device, when the brake is provided, which is slip-controlled when the vehicle starts traveling and is engaged at the first gear, the weight and the radial size can be reduced while supplying the hydraulic fluid for lubrication from the hub member side.

BRIEF DESCRIPTION OF DRAWINGS

FIG. 2 is an engagement table of friction engaging elements of the automatic transmission.

DETAILED DESCRIPTION OF THE DISCLOSURE

Hereinafter, one embodiment of the present disclosure is described with reference to the accompanying drawings.

Figure 1:
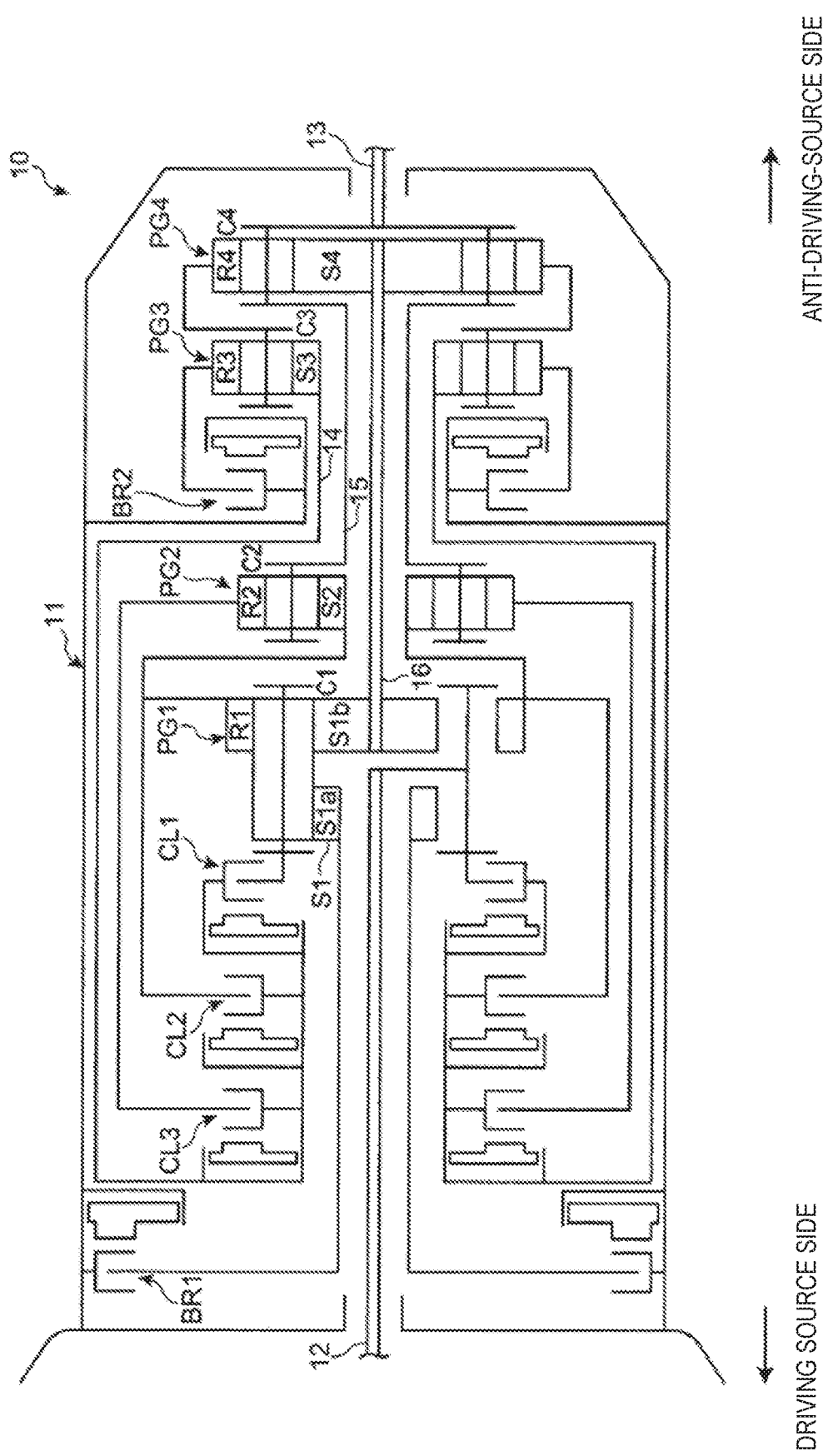
FIG. 1 is a view schematically illustrating an automatic transmission according to one embodiment of the present disclosure.

FIG. 1 is a view schematically illustrating an automatic transmission according to one embodiment of the present disclosure. An automatic transmission 10 is coupled to a driving source, such as an engine, without an intervening hydraulic power transmission device, such as a torque converter. The automatic transmission 10 includes, inside a transmission case 11, an input shaft 12 coupled to the driving source and disposed at the driving-source side (left side in this figure), and an output shaft 13 disposed at the opposite side from the driving-source side or an anti-driving-source side (right side in the same figure). The automatic transmission 10 is of a longitudinal type for a front-engine rear-drive (FR) vehicle, etc., where the input shaft 12 and the output shaft 13 are disposed coaxially.

On the common axes of the input shaft 12 and the output shaft 13, first, second, third, and fourth planetary gear sets (hereinafter, simply referred to as "first, second, third, and fourth gear sets") PG1, PG2, PG3, and PG4 are disposed in this order from the driving-source side.

Inside the transmission case 11, a first clutch CL1 is disposed at the driving-source side of the first gear set PG1, a second clutch CL2 is disposed at the driving-source side of the first clutch CL1, and a third clutch CL3 is disposed at the driving-source side of the second clutch CL2. Moreover, a first brake BR1 is disposed at the driving-source side of the third clutch CL3, and a second brake BR2 is disposed at the driving-source side of the third gear set PG3 and at the anti-driving-source side of the second gear set PG2.

Each of the first, second, third, and fourth gear sets PG1, PG2, PG3, and PG4 is of a single pinion type in which pinions supported by a carrier directly mesh with a sun gear and a ring gear. The first, second, third, and fourth gear sets PG1, PG2, PG3, and PG4 each has sun gears S1, S2, S3, and S4, ring gears R1, R2, R3, and R4, and carriers C1, C2, C3, and C4 as rotary members, respectively.

The first gear set PG1 is of a double sun gear type in which the sun gear S1 is axially divided into two. The sun gear S1 has a first sun gear S1a disposed at the driving-source side, and a second sun gear S1b disposed at the anti-driving-source side. The first and second sun gears S1a and S1b have the same number of teeth, and mesh with the same pinions supported by the carrier C1. Thus, the first and the second sun gears S1a and S1b always rotate together.

In the automatic transmission 10, the sun gear S1 of the first gear set PG1, in more detail, the second sun gear S1b is always coupled to the sun gear S4 of the fourth gear set PG4, the ring gear R1 of the first gear set PG1 is always coupled to the sun gear S2 of the second gear set PG2, the carrier C2 of the second gear set PG2 is always coupled to the carrier C4 of the fourth gear set PG4, and the carrier C3 of the third gear set PG3 is always coupled to the ring gear R4 of the fourth gear set PG4.

The input shaft 12 is always coupled to the carrier C1 of the first gear set PG1 via the first sun gear S1a and the second sun gear S1b, and the output shaft 13 is always coupled to the carrier C4 of the fourth gear set PG4.

The first clutch CL1 is disposed between the input shaft 12 and the carrier C1 of the first gear set PG1, and the sun gear S3 of the third gear set PG3 to connect and disconnect these gear sets, and the second clutch CL2 is disposed between the ring gear R1 of the first gear set PG1 and the sun gear S2 of the second gear set PG2, and the sun gear S3 of the third gear set PG3 to connect and disconnect these gear sets, and the third clutch CL3 is disposed between the ring gear R2 of the second gear set PG2 and the sun gear S3 of the third gear set PG3 to connect and disconnect these gear sets.

The first brake BR1 is disposed between the transmission case 11, and the sun gear S1 of the first gear set PG1 (specifically, the first sun gear S1a) to connect and disconnect these gears, and the second brake BR2 is disposed between the transmission case 11 and the ring gear R3 of the third gear set PG3 to connect and disconnect these gears.

With the above structure, the automatic transmission 10 forms, as illustrated in FIG. 2, first to eighth gear in a D-range or drive range, and a reverse gear in an R-range or reverse range by combining the engaged state of the first clutch CL1, the second clutch CL2, the third clutch CL3, the first brake BR1, and the second brake BR2.

In the automatic transmission 10, the second brake BR2 which is engaged at the first gear when the vehicle starts traveling is slip-controlled, and the second brake BR2 corresponds to a friction engaging element of the automatic transmission according to the present disclosure. Below, this brake BR2 is described.

Figure 3:
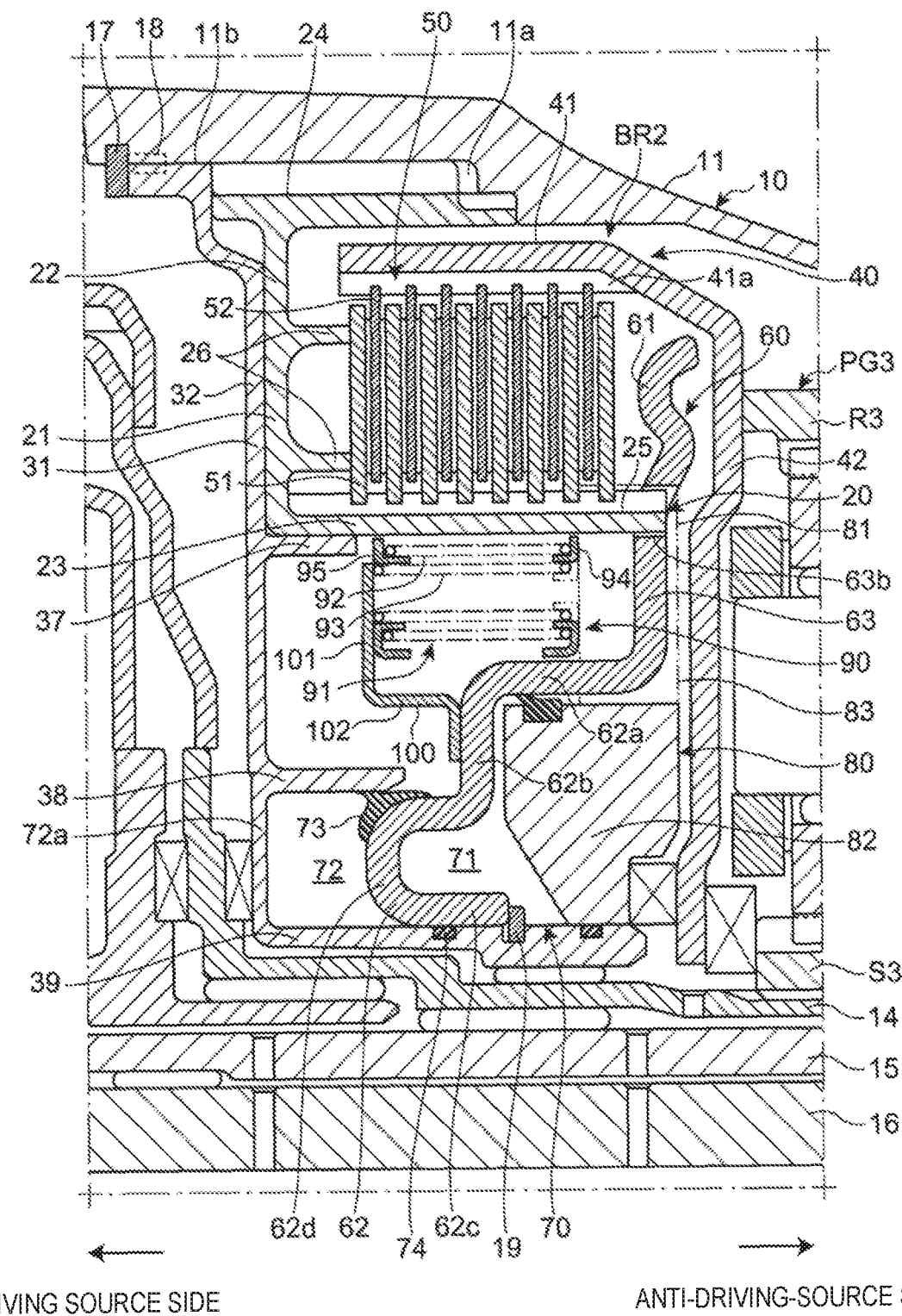
FIG. 3 is a cross-sectional view of a brake and peripheral parts of the automatic transmission.
Figure 4:
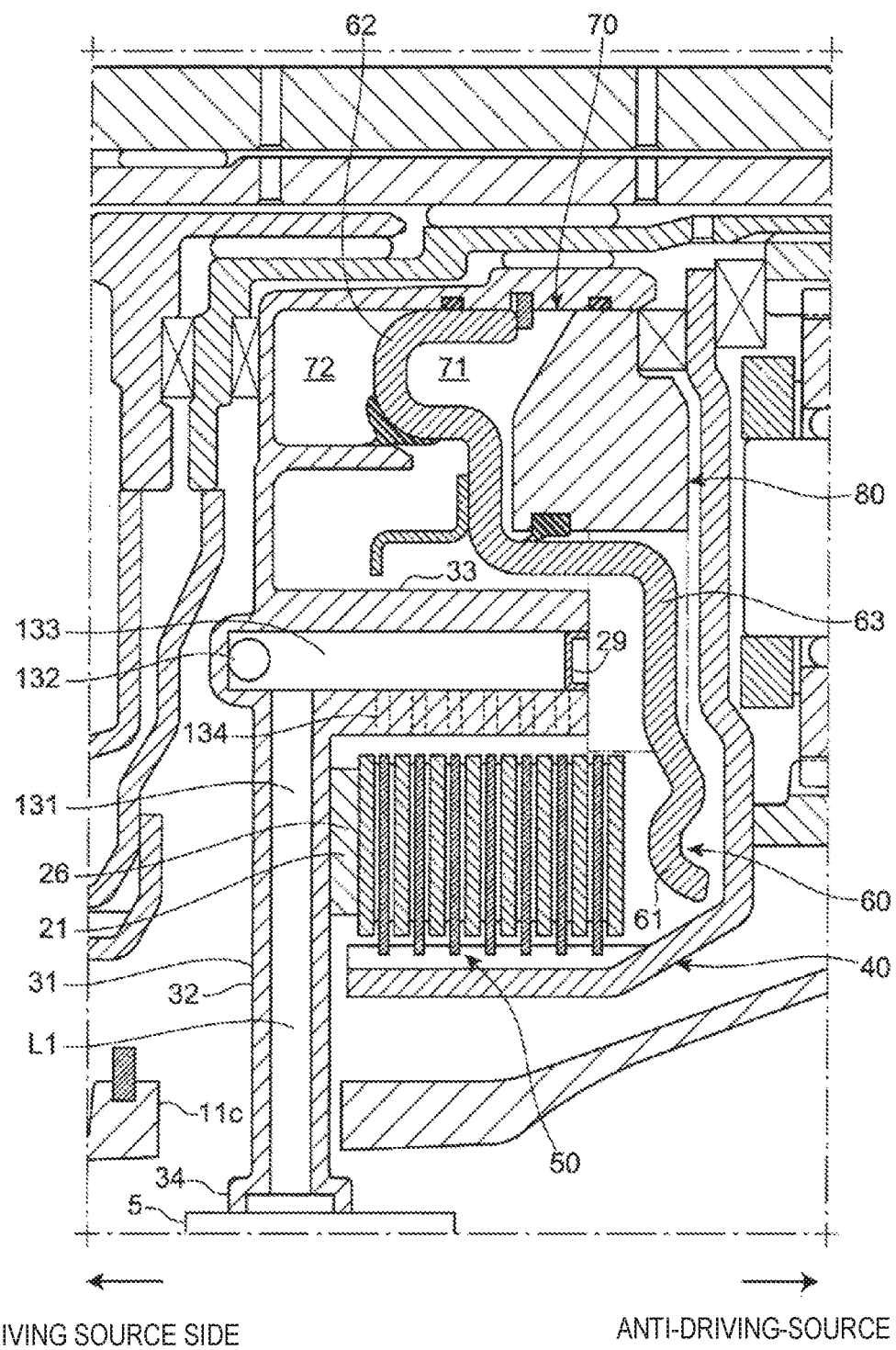
FIG. 4 is another cross-sectional view of the brake and the peripheral parts of the automatic transmission.
Figure 5:
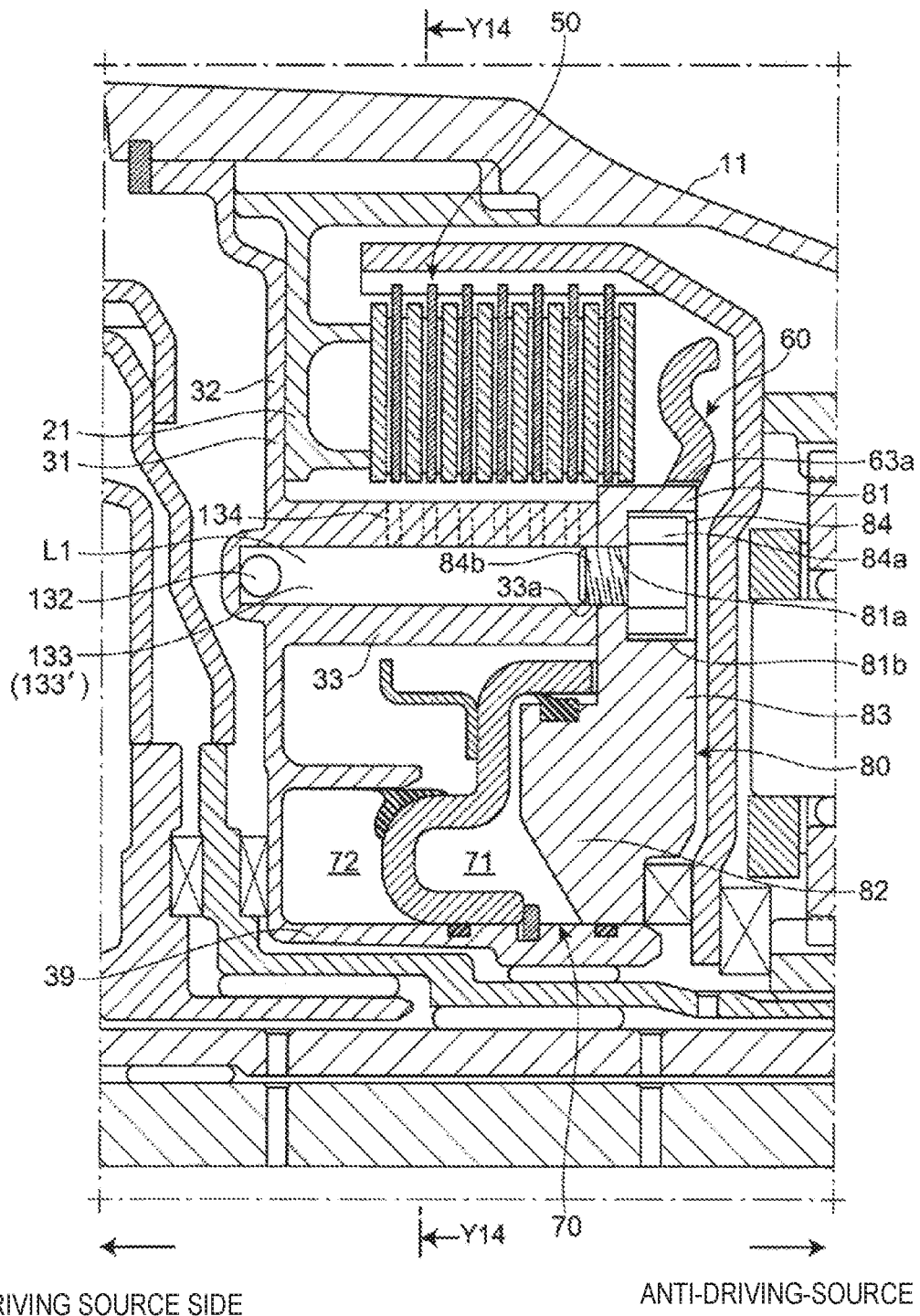
FIG. 5 is another cross-sectional view of the brake and the peripheral parts of the automatic transmission.
Figure 6:
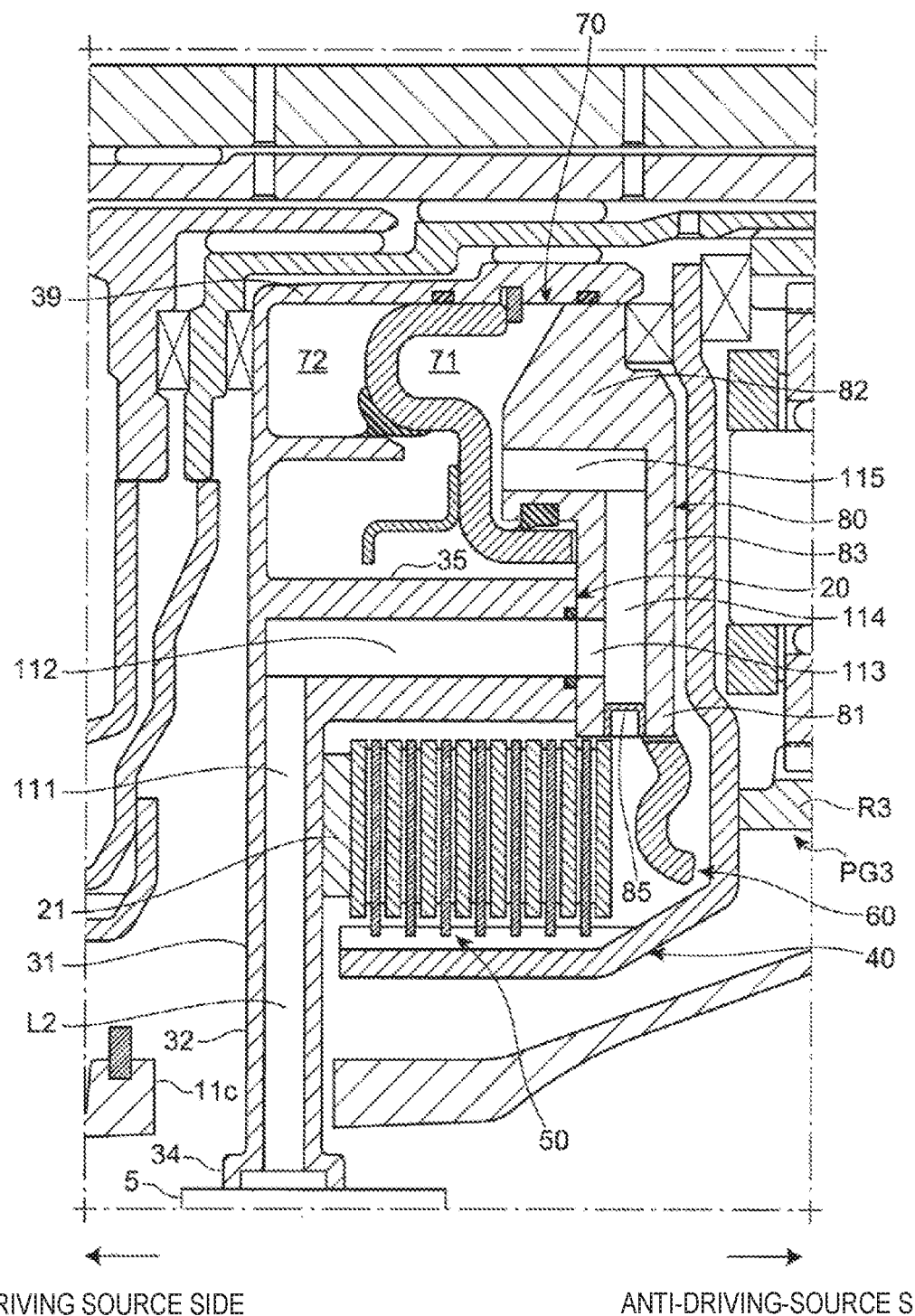
FIG. 6 is another cross-sectional view of the brake and the peripheral parts of the automatic transmission.
Figure 7:
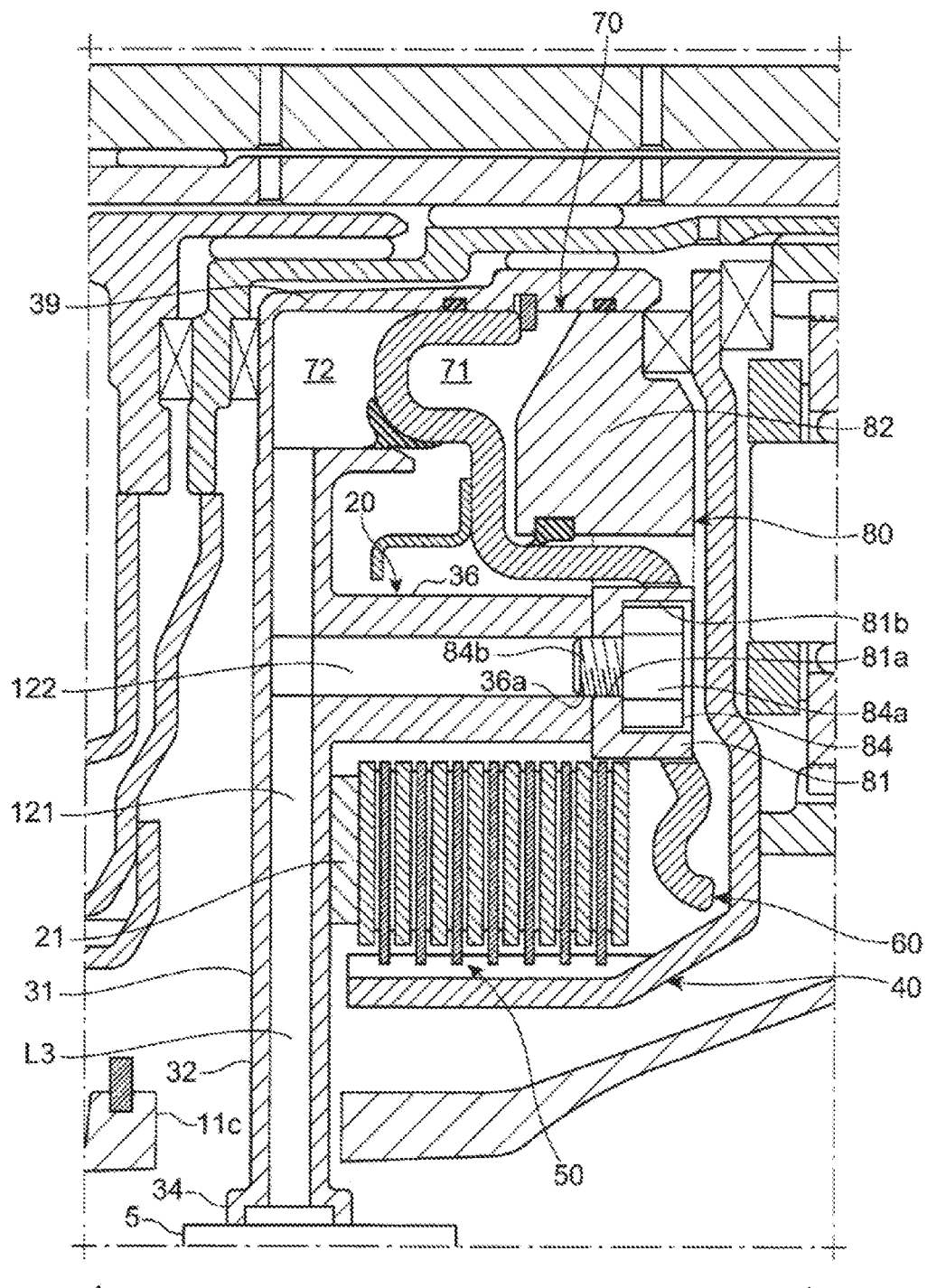
FIG. 7 is another cross-sectional view of the brake and the peripheral parts of the automatic transmission.

FIG. 3 is a cross-sectional view of the brake and peripheral parts of the automatic transmission, and FIG. 4 is another cross-sectional view of the brake and the peripheral parts of the automatic transmission. FIGS. 5 to 7 are other cross-sectional views of the brake and the peripheral parts of the automatic transmission. FIGS. 3 to 7 illustrate the cross-section of the brake and peripheral parts of the automatic transmission, taken along lines Y3-Y3, Y4-Y4, Y5-Y5, Y6-Y6, and Y7-Y7 of FIG. 8 described later, respectively.

As illustrated in FIGS. 3 to 7, the brake BR2 is accommodated in the transmission case 11 formed in a substantially cylindrical shape, and is disposed at the outer circumferential side of a power transfer component 14 which is coupled to the sun gear S3 of the third gear set PG3 and is integrally formed with one of a pair of inner and outer rotary members of the first, second, and third clutches CL1, CL2, and CL3.

The power transfer component 14 is disposed at the outer circumferential side of a power transfer component 15 which couples the carrier C2 of the second gear set PG2 to the carrier C4 of the fourth gear set PG4, and the power transfer component 15 is disposed at the outer circumferential side of a power transfer component 16 which couples the sun gear S1 of the first gear set PG1 (specifically, the second sun gear S1b) to the sun gear S4 of the fourth gear set PG4.

The brake BR2 includes a hub member 20 coupled to the transmission case 11, a drum member 40 disposed at the anti-driving-source side of the hub member 20 and coupled to the ring gear R3 of the third gear set PG3, a plurality of friction plates 50 lined up in the axial directions between the hub member 20 and the drum member 40, and a piston 60 which is disposed at the anti-driving-source side of the plurality of friction plates 50 and engages the plurality of friction plates 50.

The brake BR2 has a hydraulic chamber 70 to which hydraulic fluid for biasing the piston 60 is supplied. The hydraulic chamber 70 includes a hydraulic chamber 71 for engagement to which hydraulic fluid for engagement for biasing the piston 60 in an engaging direction is supplied, and a hydraulic chamber 72 for release to which hydraulic fluid for release is supplied. The hydraulic chamber 72 for release is disposed at the opposite side of the hydraulic chamber 71 for engagement with respect to the piston 60, and biases the piston 60 in a releasing direction.

As illustrated in FIG. 6, the brake BR2 has an oil channel forming member 80 which forms a supply oil channel for engagement which supplies the hydraulic fluid to the hydraulic chamber 71 for engagement, and the oil channel forming member 80 is disposed at the anti-driving-source side of the piston 60 and is coupled to the hub member 20 at the anti-driving-source side.

The brake BR2 also has a biasing unit 90 which biases the piston 60, as illustrated in FIG. 3. The biasing unit 90 is provided with a biasing member 91 which biases the piston 60, and the biasing member 91 includes first springs 92 and second springs 93 as first biasing members and second biasing members, which apply a biasing force to the piston 60 in the engaging direction.

Figure 8:
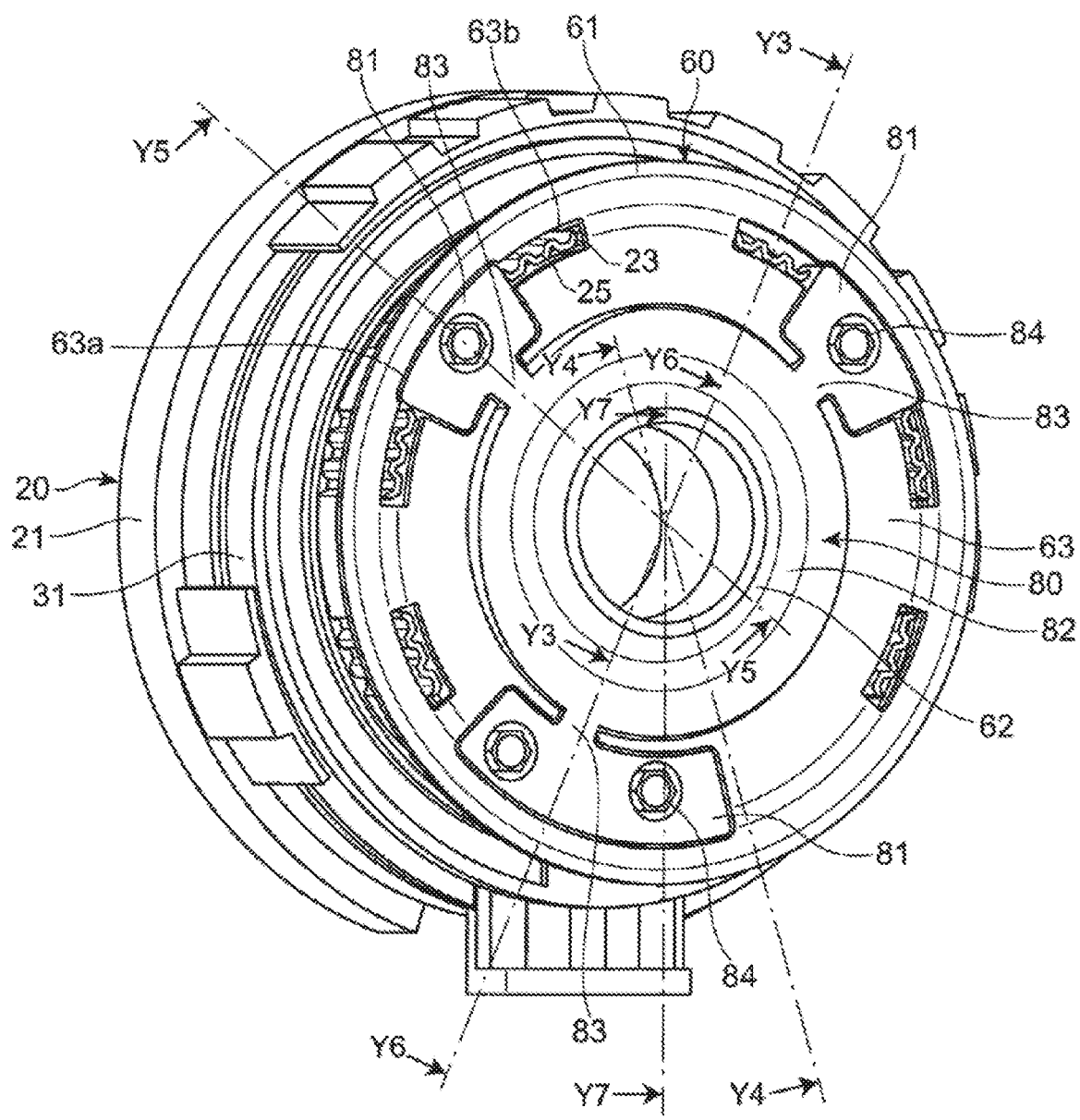
FIG. 8 is a perspective view illustrating an assembled state of a hub member, an oil channel forming member, and a piston of the brake.
Figure 9:
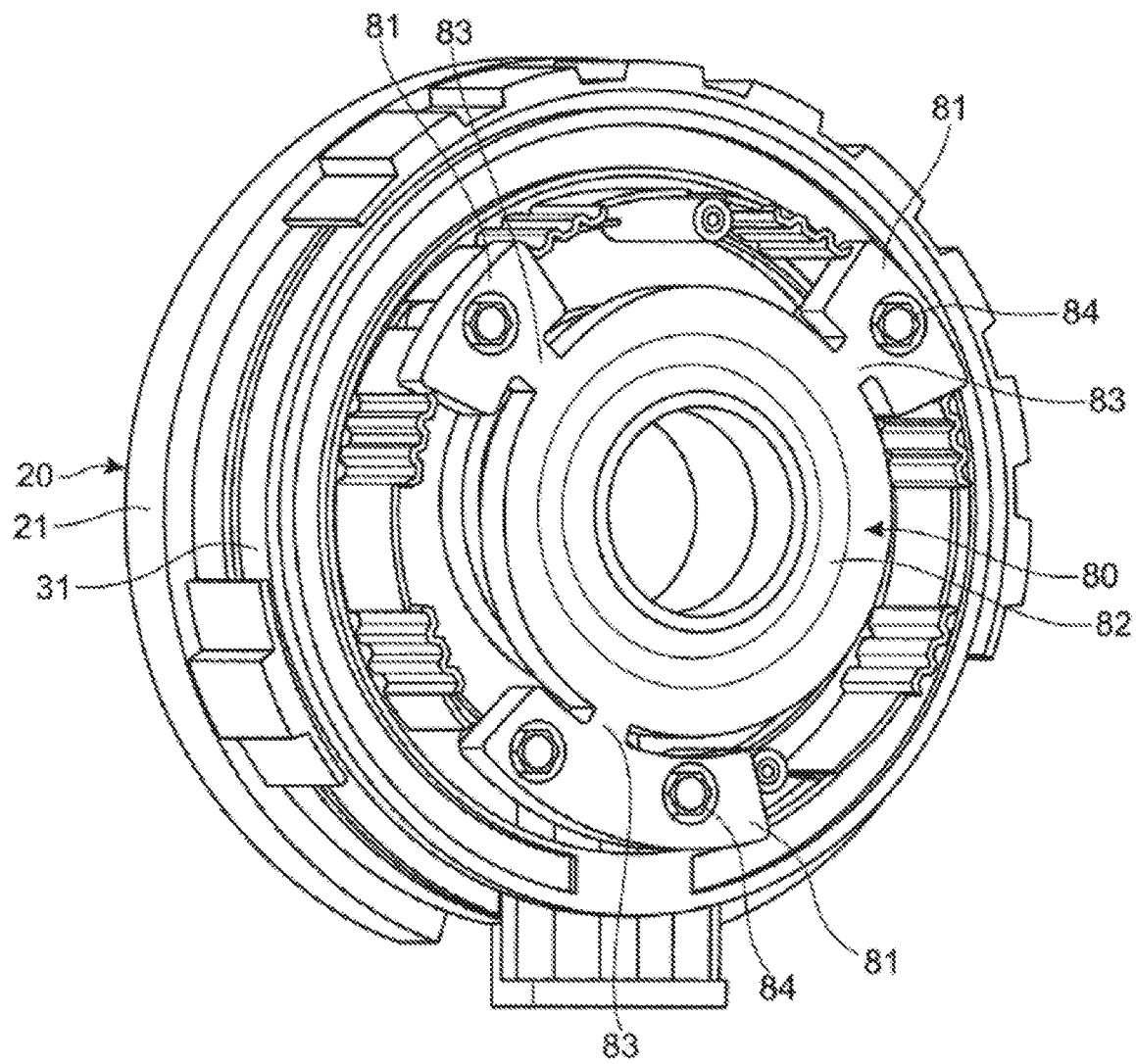
FIG. 9 is a perspective view illustrating an assembled state of the hub member and the oil channel forming member of the brake.
Figure 10:
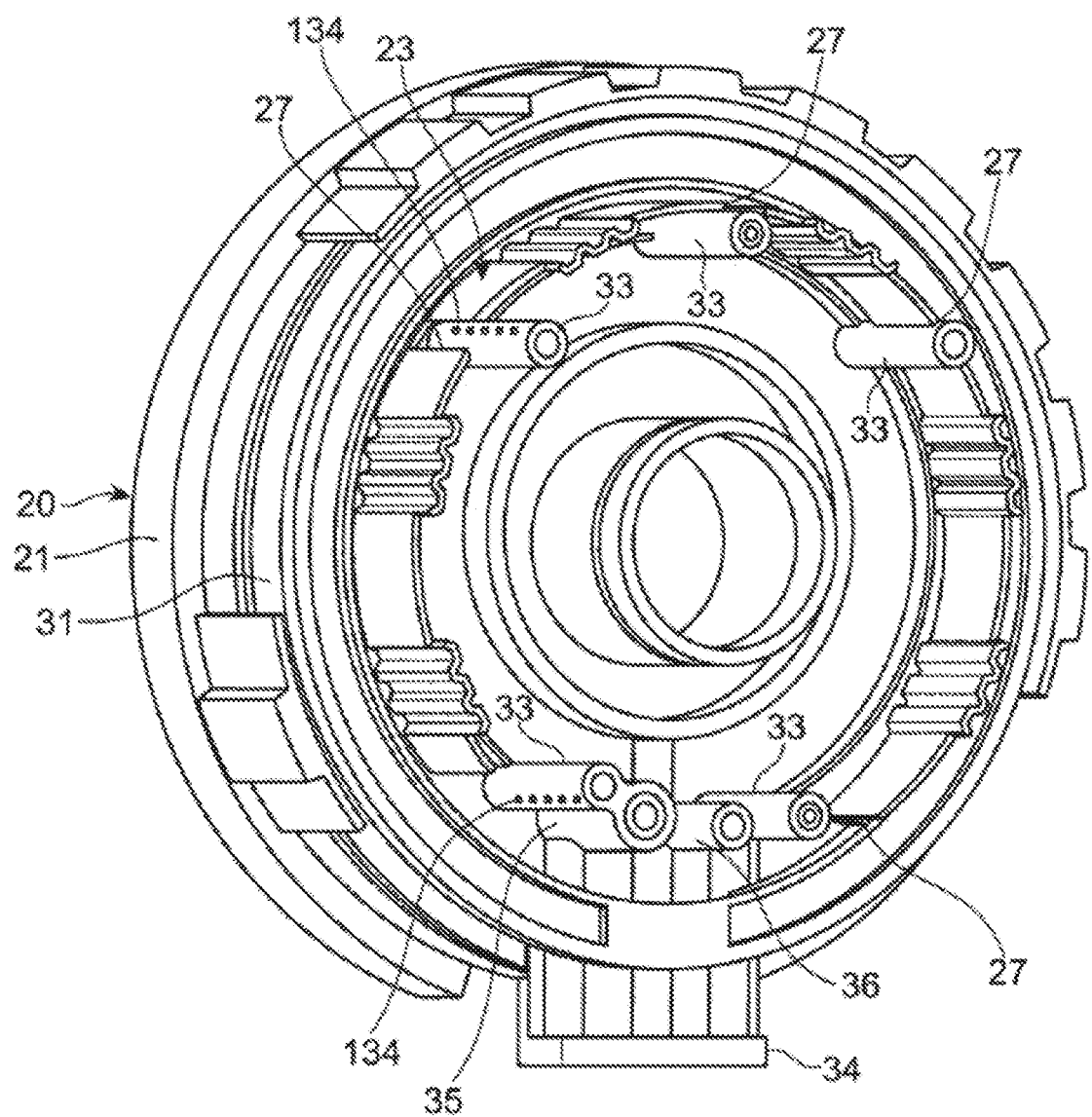
FIG. 10 is a perspective view illustrating the hub member of the brake.
Figure 11:
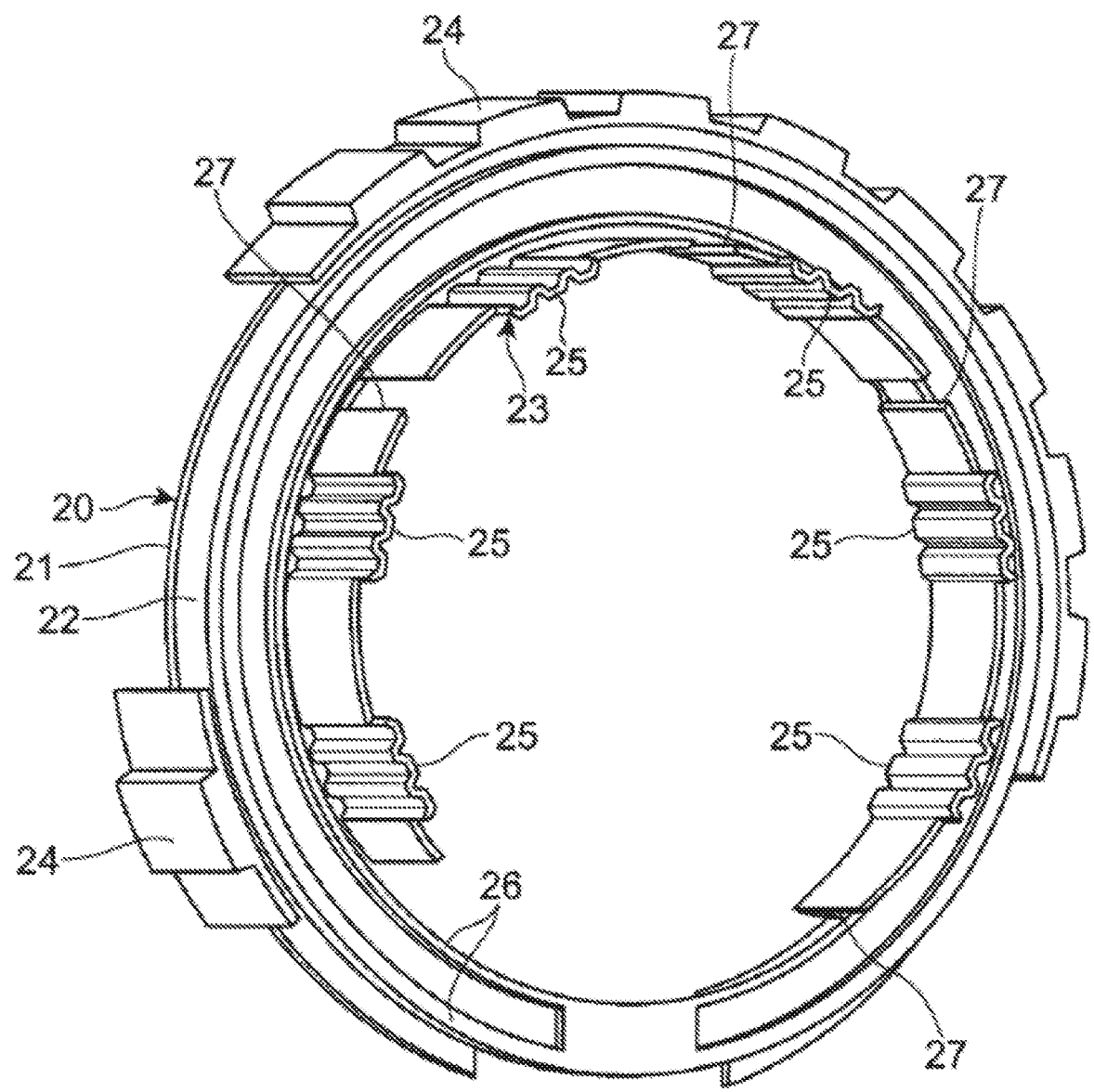
FIG. 11 is a perspective view illustrating a first hub member.
Figure 12:
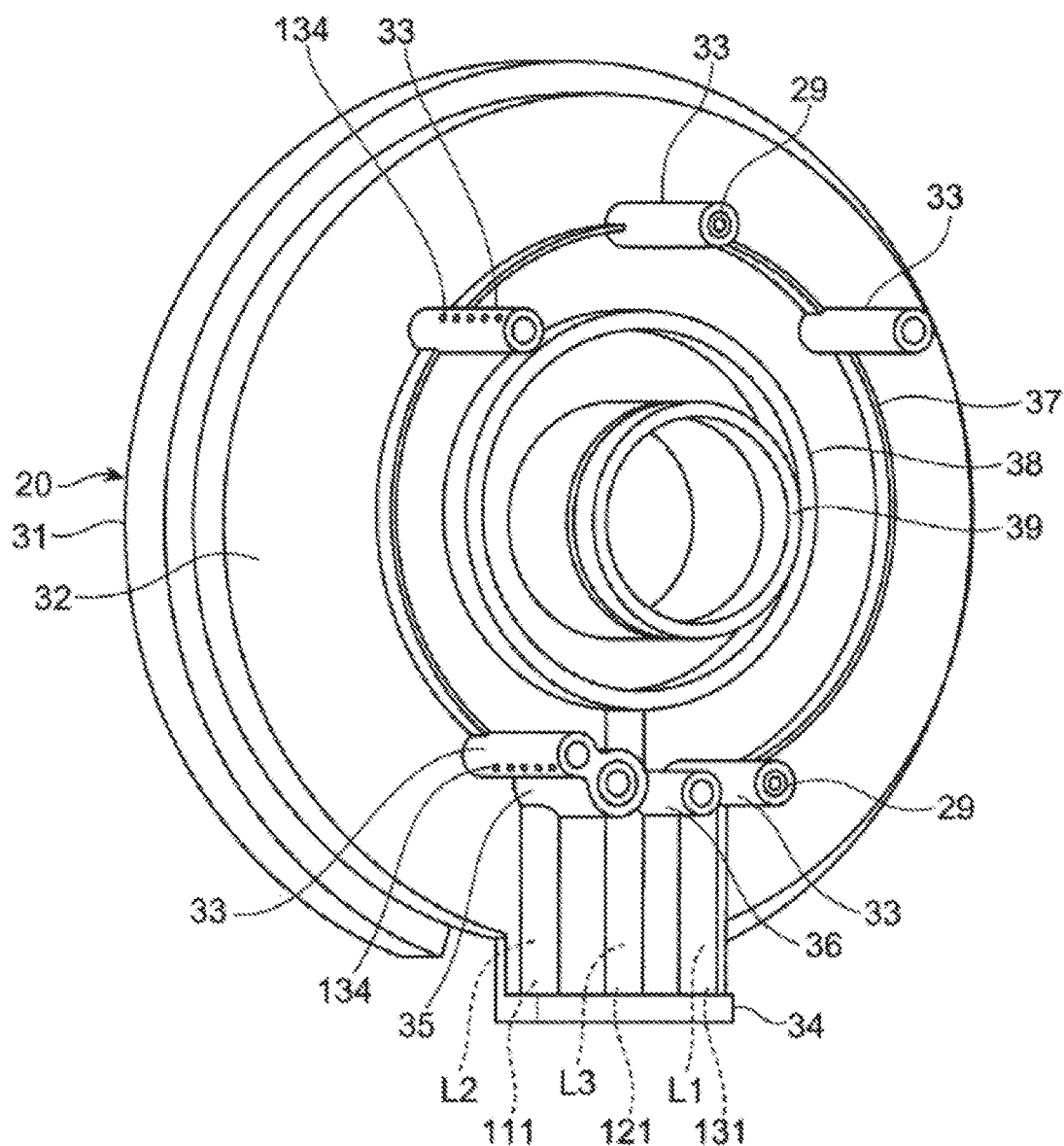
FIG. 12 is a perspective view illustrating a second hub member.
Figure 13:
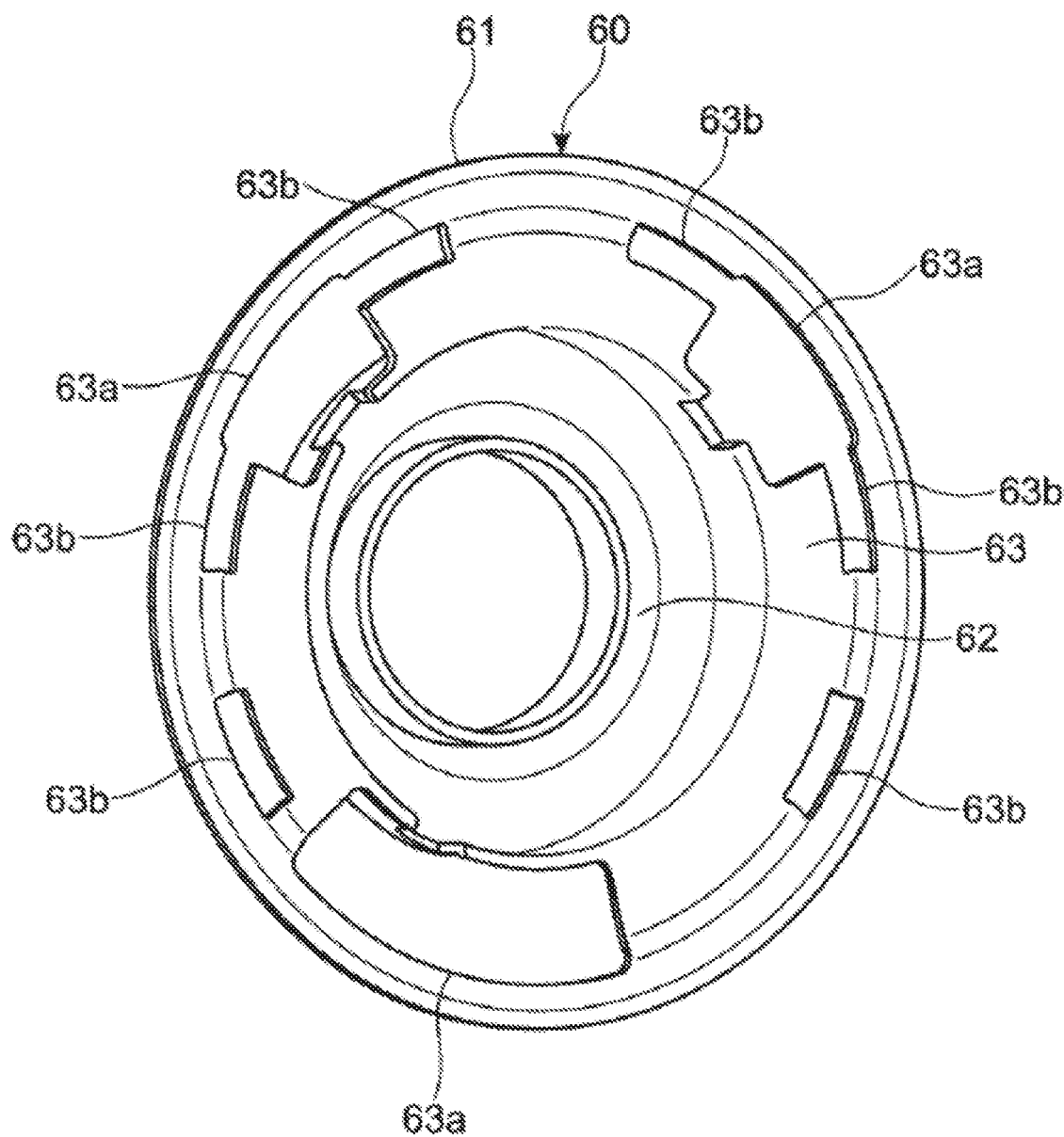
FIG. 13 is a perspective view illustrating the piston.
Figure 14:
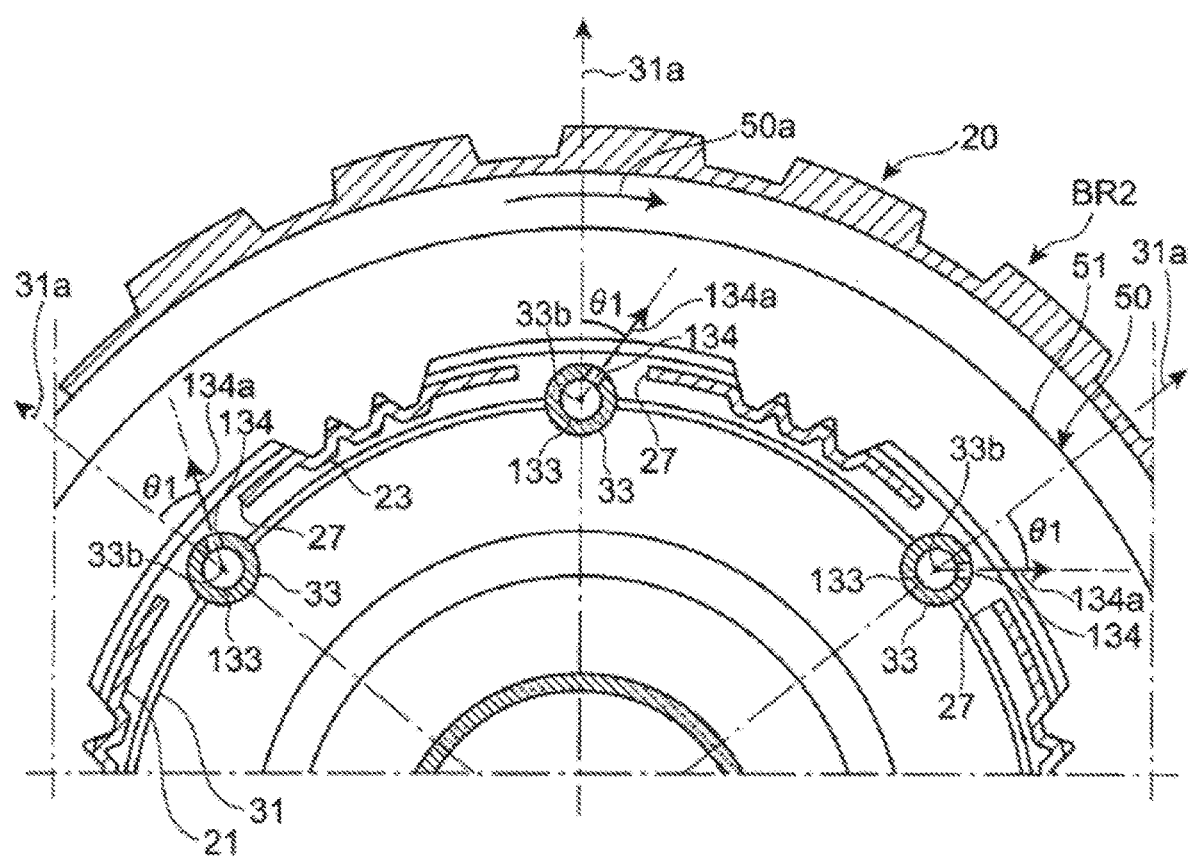
FIG. 14 is a cross-sectional view of the hub member, taken along a line Y14-Y14 in FIG. 5.
Figure 15:
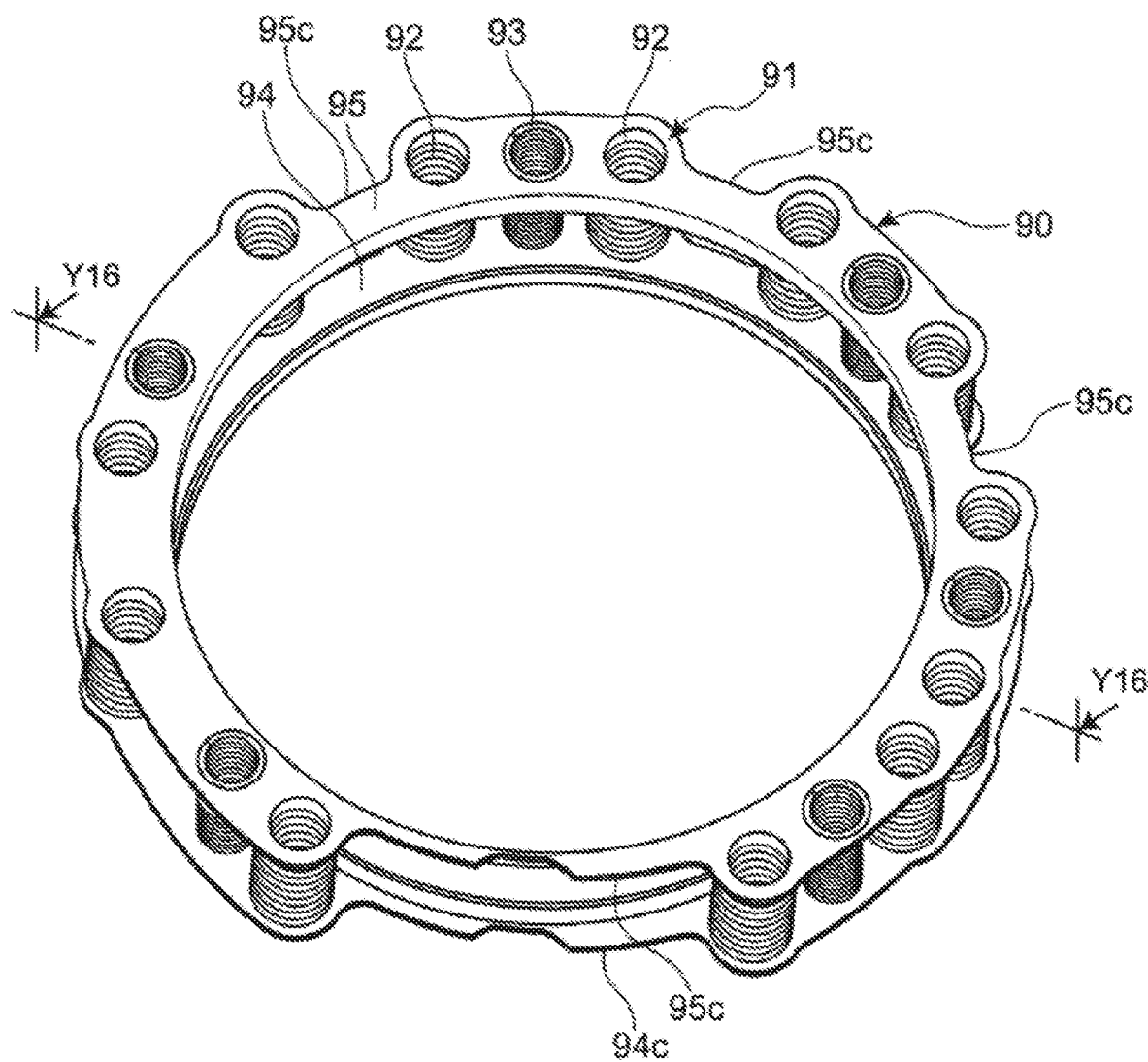
FIG. 15 is a perspective view illustrating a biasing unit.
Figure 16:
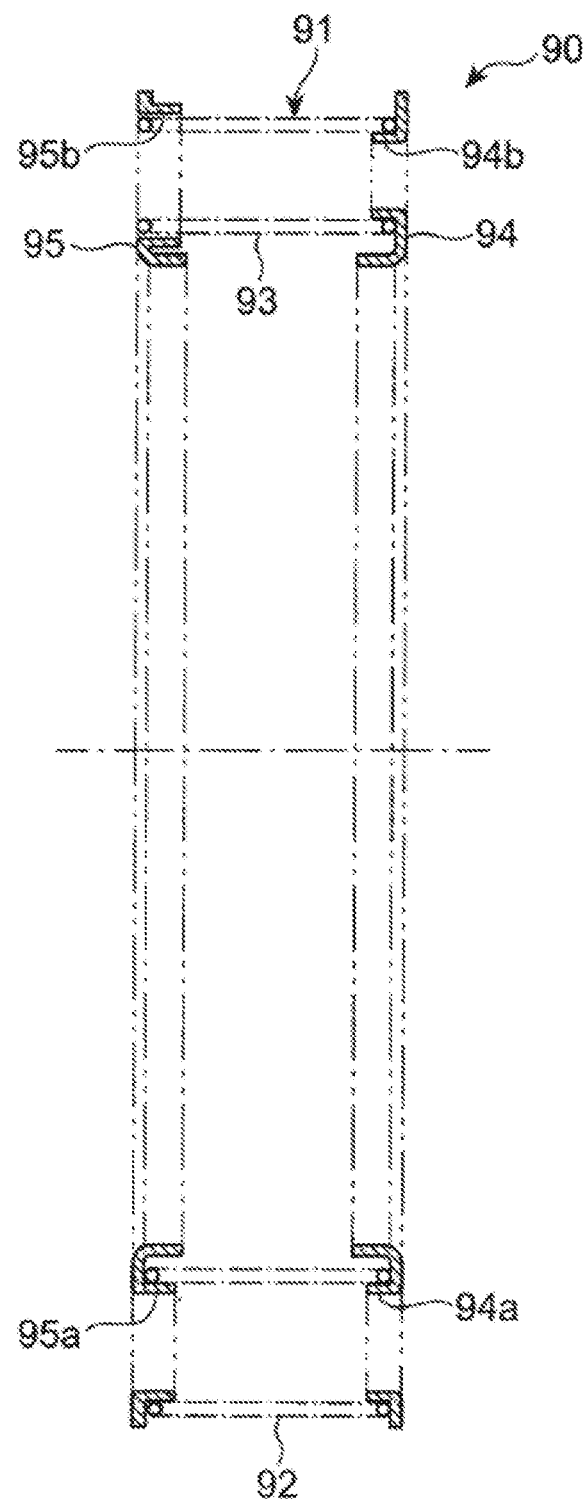
FIG. 16 is a cross-sectional view of the biasing unit, taken along a line Y16-Y16 in FIG. 15.

FIG. 8 is a perspective view illustrating an assembled state of the hub member, the oil channel forming member, and the piston of the brake, FIG. 9 is a perspective view illustrating an assembled state of the hub member and the oil channel forming member of the brake, FIG. 10 is a perspective view illustrating the hub member of the brake, FIG. 11 is a perspective view illustrating a first hub member, FIG. 12 is a perspective view illustrating a second hub member, FIG. 13 is a perspective view illustrating the piston, FIG. 14 is a cross-sectional view of the hub member taken along a line Y14-Y14 in FIG. 5, FIG. 15 is a perspective view illustrating the biasing unit, and FIG. 16 is a cross-sectional views of the biasing unit taken along a line Y16-Y16 in FIG. 15. Note that FIG. 14 also illustrates one of stationary-side friction plates 51 of the friction plates 50.

As illustrated in FIGS. 3 to 14, the hub member 20 coupled to the transmission case 11 includes a first hub member 21 with which the friction plates 50 are spline-engaged, and a second hub member 31 which supplies the hydraulic fluid for lubrication to the friction plates 50. The second hub member 31 is disposed adjacent to the first hub member 21 at the driving-source side.

As illustrated in FIG. 3, the first hub member 21 includes a vertical wall part 22 which extends in a direction perpendicular to the axial directions of the transmission case 11 and is formed in a substantially annular shape, and a cylindrical part 23 disposed radially inward of the vertical wall part 22 and formed in a substantially cylindrical shape extending to the anti-driving-source side from the vertical wall part 22.

The first hub member 21 has a spline part 24 which is spline formed in an outer circumferential surface of the vertical wall part 22, and the spline part 24 is coupled to the transmission case 11 by being spline-engaged with a spline part 11a formed in the inner circumferential surface of the transmission case 11.

The cylindrical part 23 of the first hub member 21 has a plurality of (e.g., six) spline parts 25 in the circumferential directions, which form a spline in the outer circumferential surface, and the stationary-side friction plates 51 which constitute the friction plates 50 are spline-engaged with the spline parts 25. The cylindrical part 23 of the first hub member 21 constitutes an inner fixed member coupled to the transmission case 11.

The cylindrical part 23 of the first hub member 21 has a given axial length for the spline parts 25 spline-engaging with the plurality of friction plates 50 also in the released state of the plurality of friction plates 50, and a part other than the spline parts 25 is formed shorter in the axial directions than the spline parts 25.

As illustrated in FIG. 5, the second hub member 31 includes a vertical wall part 32 which extends in a direction perpendicular to the axial directions of the transmission case 11 and is formed in a substantially annular shape, and boss parts 33 for lubrication as a feed part for lubrication which extends to the anti-driving-source side from the vertical wall part 32, is formed in a substantially cylindrical shape, and supplies the hydraulic fluid for lubrication to the friction plates 50.

As illustrated in FIG. 3, the second hub member 31 is fitted at the outer circumferential surface of the vertical wall part 32 into an inner circumferential surface 11b of the transmission case 11, on the driving-source side of the spline part 24 of the first hub member 21. The second hub member 31 is prevented from being pulled out to the driving-source side by a snap ring 17, and is coupled to the transmission case 11 by being fixed to the transmission case 11 using a rotation-stop pin 18. Note that the second hub member 31 may be fixedly press-fitted into the inner circumferential surface 11b of the transmission case 11 to be coupled to the transmission case 11.

As illustrated in FIG. 12, the second hub member 31 is provided with a plurality of boss parts 33 for lubrication (specifically, five boss parts 33 for lubrication). The five boss parts 33 for lubrication are disposed on substantially the same circumference centering on the axes of the input shaft 12 and the output shaft 13, but at different positions in the circumferential directions. Each boss part 33 for lubrication is formed with a supply oil channel L1 for lubrication which supplies the hydraulic fluid for lubrication to the friction plates 50.

As illustrated in FIG. 4, in a lower part of the transmission case 11, a valve body 5 which supplies the hydraulic fluid to the hydraulic chamber 70, the friction plates 50, etc. of the brake BR2 is disposed. The valve body 5 is accommodated in an oil pan (not illustrated) attached to the lower part of the transmission case 11, and is fixed to the transmission case 11. The second hub member 31 has a valve body connection 34 for connecting to the valve body 5, and is formed so that the supply oil channel L1 for lubrication is connected with the valve body 5 through a case opening 11c formed in the transmission case 11.

As illustrated in FIG. 6, the second hub member 31 includes a boss part 35 for engagement which extends to the anti-driving-source side from the vertical wall part 32, is formed in a substantially cylindrical shape, and is provided with a supply oil channel L2 for engagement to supply the hydraulic fluid to the hydraulic chamber 71 for engagement, and as illustrated in FIG. 7, a boss part 36 for release which extends to the anti-driving-source side from the vertical wall part 32, is formed in a substantially cylindrical shape, and is provided with a supply oil channel L3 for release to supply the hydraulic fluid to the hydraulic chamber 72 for release.

As illustrated in FIG. 12, the boss part 35 for engagement and the boss part 36 for release are disposed at different positions on substantially the same circumference centering on the axes of the input shaft 12 and the output shaft 13, together with the boss parts 33 for lubrication, and are disposed between two of the boss parts 33 for lubrication disposed on a lower side of the transmission case 11.

In the automatic transmission 10, the supply oil channel L2 for engagement, the supply oil channel L3 for release, and the supply oil channel L1 for lubrication are lined up in the circumferential directions at a lower side of the transmission case 11, and the second hub member 31 is formed so that the supply oil channel L2 for engagement, the supply oil channel L3 for release, and the supply oil channel L1 for lubrication are connected to the valve body 5.

As illustrated in FIG. 3, the second hub member 31 is provided with a first cylindrical part 37, a second cylindrical part 38, and a third cylindrical part 39 which extend from the vertical wall part 32 to the anti-driving-source side and are formed in a substantially cylindrical shape. The first cylindrical part 37 is disposed radially inward of the cylindrical part 23 of the first hub member 21 and extends from the radial center side of the vertical wall part 32, the second cylindrical part 38 extends from the vertical wall part 32 radially inward of the first cylindrical part 37, and the third cylindrical part 39 extends from the vertical wall part 32 radially inward of the second cylindrical part 38. The first cylindrical part 37 is disposed on substantially the same circumference as the five boss parts 33 for lubrication, and is provided so as to connect between the boss parts 33 for lubrication except for those located at the lower side of the transmission case 11.

The second cylindrical part 38 is formed longer in the axial directions than the first cylindrical part 37, and the third cylindrical part 39 is formed longer in the axial directions than the second cylindrical part 38. The first cylindrical part 37 functions as a stop member which catches a second retainer plate 95 of the biasing unit 90 described later. The second cylindrical part 38 and the third cylindrical part 39 constitute a cylinder 72a of the hydraulic chamber 72 for release, together with the vertical wall part 32.

Thus, in the hub member 20 formed in this way, the first hub member 21 is made of material with a higher strength than the second hub member 31. For example, the first hub member 21 is made of a ferrous material, and the second hub member 31 is made of an aluminum-based material.

Since the first hub member 21 which receives the force inputted from the friction plates 50 when engaging the brake BR2 is made of the material with the higher strength than the second hub member 31, tooth heights of the spline parts 25 can be reduced, as compared with a case where the first hub member 21 is made of the same material as the second hub member 31, thereby reducing the radial size.

Especially, since the first hub member 21 is made of ferrous material and the second hub member 31 is made of the aluminum-based material, the tooth heights of the spline parts 25 can be reduced, as compared with the case where the first hub member 21 and the second hub member 31 are made of the aluminum-based material, thereby reducing the radial size. Moreover, the weight can also be reduced as compared with the case where the first hub member 21 and the second hub member 31 are made of the ferrous material.

The drum member 40 includes a cylindrical part 41 disposed so as to oppose to the outer circumferential surface of the cylindrical part 23 of the first hub member 21, extending in the axial directions, and formed in a substantially cylindrical shape, and a vertical wall part 42 extending in a direction perpendicular to the axial directions of the transmission case 11, to radially inward of the cylindrical part 41 from the anti-driving-source-side of the cylindrical part 41, is formed in a substantially annular shape.

The vertical wall part 42 of the drum member 40 is coupled to the ring gear R3. The cylindrical part 41 of the drum member 40 has a spline part 41a where spline is formed in an inner circumferential surface thereof, and rotation-side friction plates 52 which constitute the friction plates 50 are spline-engaged with the spline part 41a. The vertical wall part 42 of the drum member 40 constitutes an outer rotary member coupled to the ring gear R3 as the rotary member. The stationary-side friction plates 51 and the rotation-side friction plates 52 are disposed alternately in the axial directions.

The piston 60 is disposed between the hub member 20 and the drum member 40, specifically, between the cylindrical part 23 of the first hub member 21 and the cylindrical part 41 of the drum member 40, and is fitted onto the outer circumferential surface of the third cylindrical part 39 of the second hub member 31 so as to be slidable. The piston 60 is prevented from being pulled out to the anti-driving-source side by a snap ring 19.

The piston 60 is formed annularly, and includes a pressing part 61 which is provided at the outer circumferential side and presses the friction plates 50, a hydraulic chamber for engagement forming part 62 which is provided at the inner circumferential side and forms the hydraulic chamber 71 for engagement, and a coupling part 63 which couples the pressing part 61 to the hydraulic chamber for engagement forming part 62 and extends radially.

The pressing part 61 is disposed at the anti-driving-source side of the friction plates 50, the hydraulic chamber for engagement forming part 62 is disposed radially inward of the cylindrical part 23 of the first hub member 21, and the coupling part 63 is provided so as to couple the pressing part 61 to the hydraulic chamber for engagement forming part 62. The hydraulic chamber for engagement forming part 62 is provided so as to project to the driving-source side from the coupling part 63.

As illustrated in FIGS. 5 to 7, the oil channel forming member 80 is disposed at the anti-driving-source side of the piston 60. The oil channel forming member 80 is fitted at the outer circumferential side of the third cylindrical part 39 of the second hub member 31, and is coupled to the boss parts 33 and 36 of the second hub member 31, specifically, to the driving-source side of the boss part 33 for lubrication and the boss part 36 for release.

The oil channel forming member 80 includes bonding parts 81 which are provided at the outer circumferential side and are coupled to the anti-driving-source side of the boss parts 33 and 36 of the second hub member 31, a hydraulic chamber for engagement forming part 82 which is provided to the inner circumferential side, is disposed at the anti-driving-source side of the piston 60, and forms the hydraulic chamber 71 for engagement, and coupling parts 83 which couple the bonding parts 81 to the hydraulic chamber forming part 82 for engagement and extend radially.

As illustrated in FIG. 3, the hydraulic chamber for engagement forming part 82 has a given thickness, is formed annularly, and fitted between the third cylindrical part 39 of the second hub member 31 and the outer circumferential surface of the hydraulic chamber for engagement forming part 62 of the piston 60. The hydraulic chamber 71 for engagement is comprised of the hydraulic chamber for engagement forming part 62 of the piston 60, the hydraulic chamber for engagement forming part 82 of the oil channel forming member 80, and the third cylindrical part 39 of the second hub member 31.

As illustrated in FIGS. 5 and 7, the bonding parts 81 are formed thinner than the hydraulic chamber for engagement forming part 82, and overlap with the anti-driving-source side of the hydraulic chamber for engagement forming part 82 in the axial directions. As illustrated in FIGS. 8 and 9, the bonding parts 81 are each formed in an arc shape. The oil channel forming member 80 is provided with a plurality of bonding parts 81 in the circumferential directions (in this embodiment, three bonding parts 81), which are substantially equally spaced from each other in the circumferential directions.

In the bonding parts 81, bolt insertion holes 81a into which fastening bolts 84 as fastening members are inserted, and bolt accommodation holes 81b where heads 84a of the fastening bolts 84 are accommodated, are provided. The oil channel forming member 80 is coupled to the anti-driving-source side of the boss parts 33 and 36 of the second hub member 31 by threadedly engaging the fastening bolts 84 through the bolt insertion holes 81a with threaded holes 33a and 36a formed at the anti-driving-source side of the boss parts 33 and 36. As the fastening bolt 84, a bolt with seal in which an outer circumferential surface of a thread part 84b is covered with a sealant is used.

Each coupling part 83 of the oil channel forming member 80 has a thickness substantially equal to the bonding parts 81, and as illustrated in FIGS. 8 and 9, it extends radially inward from a center part in the circumferential direction of the bonding part 81 and is coupled to the hydraulic chamber for engagement forming part 82.

As illustrated in FIG. 9, the bonding part 81 disposed at the lower side of the transmission case 11 is coupled at both sides in the circumferential direction thereof to the boss parts 33 and 36 of the second hub member 31 by using the two fastening bolts 84, and the two bonding parts 81 disposed at the upper side of the transmission case 11 is coupled at the center in the circumferential directions to the boss parts 33 of the second hub member 31 by using one fastening bolt 84.

Notches 63a for oil channel forming members are formed in the coupling part 63 of the piston 60, which is formed by cutting the coupling part 63 in substantially the same shape as the bonding parts 81 and the coupling parts 83 of the oil channel forming member 80 so as to correspond to the bonding parts 81 and the coupling parts 83. The oil channel forming member 80 is disposed within a radial range of the piston 60, the bonding parts 81 and the coupling parts 83 of the oil channel forming member 80 are fitted into the notches 63a for oil channel forming members of the coupling part 63 of the piston 60, and are disposed so as to overlap with the coupling part 63 of the piston 60 in the axial directions.

Thus, by the oil channel forming member 80 and the piston 60 being disposed overlapping each other in the axial directions, the axial dimension can be shortened as compared with the case where the piston 60 extends radially through the anti-driving-source side of the oil channel forming member 80, thereby reducing the axial size.

Notches 63b for spline parts are also formed in the coupling part 63 of the piston 60, which are formed by cutting the coupling part 63 in substantially the same shape as the spline parts 25 of the cylindrical part 23 of the first hub member 21 so as to correspond to the spline parts 25. The anti-driving-source side of the spline parts 25 of the cylindrical part 23 of the first hub member 21 are fitted into the notches 63b for spline parts of the coupling part 63 of the piston 60 so that the cylindrical part 23 of the first hub member 21 overlaps with the piston 60 in the axial directions.

Thus, since the anti-driving-source side of the spline parts 25 of the cylindrical part 23 of the first hub member 21 overlaps with the piston 60 in the axial directions, the axial dimension can be shortened as compared with the case where the piston 60 extends radially through the anti-driving-source side of the spline parts 25, thereby reducing the axial size, while securing the axial length of the spline parts 25 of the cylindrical part 23.

As illustrated in FIG. 3, the hydraulic chamber for engagement forming part 62 of the piston 60 includes an outer cylindrical part 62a which is fitted onto the outer circumferential side of the hydraulic chamber for engagement forming part 82 of the oil channel forming member 80 and extends axially, a hydraulic pressure for engagement receiving part 62b which extends radially inward from the driving-source side part of the outer cylindrical part 62a, and an inner cylindrical part 62c which extends to the anti-driving-source side from the radially inward part of the hydraulic pressure for engagement receiving part 62b, is fitted onto the third cylindrical part 39 of the second hub member 31, and extends axially.

In the automatic transmission 10, the hydraulic chamber 70 is disposed radially inward of the cylindrical part 23 of the first hub member 21 and the boss parts 33, 35, and 36 of the second hub member 31, and the hydraulic chamber 71 for engagement and the hydraulic chamber 72 for release are disposed radially inward of the cylindrical part 23 of the first hub member 21 and the boss parts 33, 35, and 36 of the second hub member 31.

As described above, the hydraulic chamber 71 for engagement is comprised of the hydraulic chamber for engagement forming part 62 of the piston 60, the hydraulic chamber for engagement forming part 82 of the oil channel forming member 80, and the third cylindrical part 39 of the second hub member 31. The inner cylindrical part 62c of the piston 60 is prevented from being pulled out to the anti-driving-source side by the snap ring 19.

As illustrated in FIG. 3, the hydraulic chamber 72 for release is comprised of a bulged part 62d of the piston 60 and the cylinder 72a of the second hub member 31. The bulged part 62d where the radially inward part of the hydraulic pressure for engagement receiving part 62b of the piston 60 is bulged to the driving-source side in a substantially channel shape in the cross section, is slidably fitted into the cylinder 72a of the second hub member 31 through seal members 73 and 74.

In the automatic transmission 10, the hydraulic chamber 72 for release is formed smaller in the outer diameter than the hydraulic chamber 71 for engagement, and a biasing force receiving member 100 which is coupled to the piston 60 and receives a biasing force by the biasing member 91 of the biasing unit 90 is disposed at the outer circumferential side of the hydraulic chamber 72 for release.

As illustrated in FIG. 3, the biasing force receiving member 100 is formed annularly, and includes a radially extended part 101 extending radially between the cylindrical part 23 of the first hub member 21 and the second cylindrical part 38 of the second hub member 31, and an axially extended part 102 extending axially from the radially inward part to the anti-driving-source part of the radially extended part 101.

The biasing force receiving member 100 is coupled to the piston 60 by the anti-driving-source side of the axially extended part 102 being coupled to a radially outward part of the bulged part 62d of the hydraulic pressure for engagement receiving part 62b of the piston 60. The biasing unit 90 is attached to a part between the biasing force receiving member 100 (specifically, the radially extended part 101) and the oil channel forming member 80.

As illustrated in FIGS. 15 and 16, the biasing unit 90 includes the first springs 92 and the second springs 93 which extend axially, a first retainer plate 94 which holds ends of the first springs 92 and the second springs 93 on the anti-driving-source side which are one end parts of the first springs 92 and the second springs 93, and the second retainer plate 95 which is disposed so as to be separated from the first retainer plate 94 in the axial directions and holds ends of the first springs 92 on the driving-source side which are the other end parts of the first springs 92.

The first retainer plate 94 is formed annularly and is provided with first spring guide parts 94a and second spring guide parts 94b which project to the driving-source side and formed in a cylindrical shape, to which the first springs 92 and the second springs 93 are mounted, respectively. The first springs 92 and the second springs 93 are disposed so as to radially overlap each other, but at different positions in the circumferential directions. In the automatic transmission 10, two first springs 92 are disposed at both sides of the six second springs 93, respectively.

The second retainer plate 95 is formed substantially symmetrical to the first retainer plate 94 in the axial directions. The second retainer plate 95 is provided with first spring guide parts 95a which project to the anti-driving-source side and is formed in a cylindrical shape, to which the first springs 92 are mounted. The second retainer plate 95 is provided with insertion holes 95b through which the second springs 93 are inserted so that the other ends of the second springs 93 on the driving-source side can project to the opposite side of the first retainer plate.

The first springs 92 have a larger biasing force than the second springs 93. The first springs 92 and the second springs 93 are coil springs, and the first springs 92 are large coil springs with a coil diameter larger than the second springs 93. The second springs 93 have a longer free length than the first springs 92, and are held by the first retainer plate 94 so that the other end parts of the second springs 93 can project from the second retainer plate 95 to the opposite side of the first retainer plate.

As illustrated in FIG. 3, the biasing unit 90 is attached to the transmission case 11 by the first retainer plate 94 being supported on the driving-source side at both sides in the circumferential directions of the bonding parts 81 of the oil channel forming member 80, and the second retainer plate 95 being supported at the anti-driving-source side of the radially extended part 101 of the biasing force receiving member 100.

The radially extended part 101 of the biasing force receiving member 100 has a radial dimension which is smaller than the outer diameter of the second retainer plate 95 and substantially equal to the second springs 93 so that it supports the second retainer plate 95, and supports the other end parts of the second springs 93 inserted into the insertion holes 95b of the second retainer plate 95.

The inner circumferential surface of the cylindrical part 23 of the first hub member 21 is formed radially larger than the first retainer plate 94 and the second retainer plate 95, and the biasing unit 90 is disposed at the inner circumferential side of the cylindrical part 23. In the biasing unit 90, notches 94c and 95c are formed in the first retainer plate 94 and the second retainer plate 95, respectively, corresponding to the boss parts 33, 35, and 36 of the second hub member 31.

The first cylindrical part 37 of the second hub member 31 is formed radially larger than the radially extended part 101 of the biasing force receiving member 100 so that, when the second retainer plate 95 receives the biasing force of the biasing member 91 at an end surface on the anti-driving-source side and is moved to the driving-source side, the first cylindrical part 37 catches the second retainer plate 95. The first cylindrical part 37 of the second hub member 31 functions as a stop member which catches or stops the second retainer plate 95.

The first cylindrical part 37 of the second hub member 31 is set, when the second retainer plate 95 supported by the biasing force receiving member 100 contacts thereto, the piston 60 is located at an immediately-before-contact position where the piston 60 is about to contact the plurality of friction plates 50. The immediately-before-contact position of the piston 60 is suitably set between a released position where the plurality of friction plates 50 are in the released state and a zero-clearance state where the clearance is zero.

When the second retainer plate 95 contacts the biasing force receiving member 100, the biasing force receiving member 100 receives the biasing force in the engaging direction only from the second springs 93. The piston 60 is set to be located at the zero-clearance position when the second springs 93 reach their free lengths.

Thus, the biasing unit 90 is structured so that the first springs 92 cause the biasing force to act on the piston 60 in the engaging direction from the released position to the immediately-before-contact position through the biasing force receiving member 100, and the second springs 93 cause the biasing force to act on the piston 60 in the engaging direction from the released position to the zero-clearance position through the biasing force receiving member 100.

Then, when hydraulic pressure for engagement is supplied to the hydraulic chamber 71 for engagement while the piston 60 is in the zero-clearance position, the piston 60 pushes the plurality of friction plates 50 to move them to an engaged position where the plurality of friction plates 50 become in the engaged state where the plurality of friction plates 50 become impossible to relatively rotate, by being pinched between holding parts 26 which project to the anti-driving-source side from the vertical wall part 22 of the first hub member 21, and the piston 60.

On the other hand, when the oil pressure for engagement is discharged from the hydraulic chamber 71 for engagement and oil pressure for release is then supplied to the hydraulic chamber 72 for release, while the piston 60 is in the engaged position, the piston 60 is biased in the releasing direction and moved to the zero-clearance position.

The piston 60 is further biased in the releasing direction while resisting the second springs 93, and reaches the immediately-before-contact position. Then, the piston 60 is biased in the releasing direction while resisting the first springs 92 and the second springs 93, and reaches the released position.

Next, the supply oil channels which supply the hydraulic fluid to the brake BR2 is described. The supply oil channel L2 for engagement which supplies the hydraulic fluid for engagement to the hydraulic chamber 71 for engagement of the brake BR2 is formed in the second hub member 31 and the oil channel forming member 80. The supply oil channel L3 for release which supplies the hydraulic fluid for release to the hydraulic chamber 72 for release of the brake BR2 and the supply oil channel L1 for lubrication which supplies the hydraulic fluid for lubrication to the friction plates 50, are formed in the second hub member 31. The supply oil channel L2 for engagement and the supply oil channel L3 for release constitute a supply oil channel for operation which supplies the hydraulic fluid to the hydraulic chamber 70.

As illustrated in FIG. 6, the supply oil channel L2 for engagement is comprised of a radial oil channel 111 which is formed in the vertical wall part 32 of the second hub member 31, and extends radially, an axial oil channel 112 which is formed in the boss part 35 for engagement, extends axially, and is coupled to the radial oil channel 111, axial oil channels 113 which are formed in the bonding parts 81 of the oil channel forming member 80, extend axially, and are coupled to the axial oil channel 112, radial oil channels 114 which are formed in the bonding parts 81, the coupling parts 83, and the hydraulic chamber for engagement forming part 82 of the oil channel forming member 80, extend radially, and are coupled to the axial oil channels 113, and axial oil channels 115 which are formed in the hydraulic chamber for engagement forming part 82 of the oil channel forming member 80, extend axially, are connected to the radial oil channels 114, and open to the hydraulic chamber 71 for engagement.

The second hub member 31 is formed so as to connect the supply oil channel L2 for engagement to the valve body 5. The radial oil channel 111 of the second hub member 31 is formed in the vertical wall part 32 of the second hub member 31, opens to a lower surface of the valve body connection 34, and is connected to the valve body 5. The valve body 5 supplies the hydraulic fluid for engagement to the hydraulic chamber 71 for engagement through the supply oil channel L2 for engagement to supply a given oil pressure for engagement.

The radial oil channels 114 of the oil channel forming member 80 are formed so as to extend radially inward from the outer circumferential surface of the bonding parts 81 of the oil channel forming member 80, and block members 85 which block openings of the radial oil channels 114 are attached to the outer circumferential surfaces of the bonding parts 81.

As illustrated in FIG. 7, the supply oil channel L3 for release is comprised of a radial oil channel 121 which is formed in the vertical wall part 32 of the second hub member 31, extends radially, and opens to the hydraulic chamber 72 for release, and an axial oil channel 122 which is formed in the boss part 36 for release, extends axially, and is coupled to the radial oil channel 121.

The second hub member 31 is formed so as to connect the supply oil channel L3 for release to the valve body 5. The radial oil channel 121 of the second hub member 31 is formed in the vertical wall part 32 of the second hub member 31, opens to the lower surface of the valve body connection 34, and is connected to the valve body 5. The valve body 5 supplies the hydraulic fluid for release to the hydraulic chamber 72 for release through the supply oil channel L3 for release to supply a given hydraulic pressure for release.

The axial oil channel 122 of the second hub member 31 is formed so as to extend axially to the driving-source side from an end surface of the boss part 36 for release on the anti-driving-source side, and the fastening bolt 84 is attached as a block member which blocks an opening of the axial oil channel 122, to the end surface of the boss part 36 for release on the anti-driving-source side. The threaded hole 36a is formed in the opening of the axial oil channel 122 at the anti-driving-source side of the boss part 36 for release.

As illustrated in FIGS. 4 and 5, the supply oil channel L1 for lubrication is comprised of a radial oil channel 131 which is formed in the vertical wall part 32 of the second hub member 31 and extends radially, a circumferential oil channel 132 which is formed in the vertical wall part 32 of the second hub member 31, extends in the circumferential directions in an arc shape, and is connected to the radial oil channel 131, axial oil channels 133 which are formed in the boss parts 33 for lubrication, extend axially, and are coupled to the circumferential oil channel 132, and supply ports 134 which are formed in the boss parts 33 for lubrication, extend radially, are connected to the axial oil channels 133, and open to the outer circumferential surfaces of the boss parts 35 for engagement.

As illustrated in FIG. 12, in the automatic transmission 10, the radial oil channels 111, 121, and 131 which constitute the supply oil channel L2 for engagement, the supply oil channel L3 for release, and the supply oil channel L1 for lubrication, respectively, are lined up in the circumferential directions at the lower side of the transmission case 11. The circumferential oil channel 132 which constitutes the supply oil channel L1 for lubrication is connected to the radial oil channel 131, extends in the circumferential directions to the radial oil channel 121 side in an arc shape, and extends to the opposite side of the radial oil channel 111 from the radial oil channel 121.

Each of the five boss parts 33 for lubrication includes the axial oil channels 133 which are connected to the circumferential oil channel 132 and extend axially, and the supply ports 134 which extend radially outward from the axial oil channels 133 to the outer circumferential surface of the boss part 33 for lubrication and supply the hydraulic fluid for lubrication to the friction plates 50. The plurality of supply ports 134 are lined up in the axial directions.

The second hub member 31 is formed so as to connect the supply oil channel L1 for lubrication to the valve body 5. The radial oil channel 131 of the second hub member 31 is formed in the vertical wall part 32 of the second hub member 31, opens to the lower surface of the valve body connection 34, and is connected to the valve body 5. The valve body 5 can supply the hydraulic fluid for lubrication to the plurality of friction plates 50 through the supply oil channel L1 for lubrication.

In the brake BR2, the hydraulic fluid for lubrication is supplied to the friction plates 50 from the outer circumferential surfaces of the boss parts 33 for lubrication of the second hub member 31 to cool the friction plates 50. It is prevented that the hydraulic fluid for lubrication supplied to the friction plates 50 moves to the inner circumferential surface of the cylindrical part 41 of the drum member 40, moves in the axial directions by the rotation of the cylindrical part 41 of the drum member 40, and stagnates there.

The two axial oil channels 133 of the second hub member 31 are formed so as to extend axially to the driving-source side from the end surfaces of the boss parts 33 for lubrication on the anti-driving-source side as illustrated in FIGS. 4 and 12, and block members 29 which block the openings of the axial oil channels 133 are attached to the end surfaces of the boss parts 33 for lubrication on the anti-driving-source side.

As illustrated in FIG. 5, three axial oil channels 133' of the second hub member 31 are formed so as to extend axially to the driving-source side from the end surfaces of the boss parts 33 for lubrication on the anti-driving-source side, and the fastening bolts 84 which block the openings of the axial oil channels 133' as block members are attached to the end surfaces of the boss parts 33 for lubrication on the anti-driving-source side. The threaded holes 33a are formed in the openings of the axial oil channels 133" at the anti-driving-source side of the boss parts 33 for lubrication.

As illustrated in FIG. 10, notches 27 for lubrication are formed by cutting the cylindrical part 23 of the first hub member 21 in the circumferential directions corresponding to the boss parts 33 for lubrication of the second hub member 31. The boss parts 33 for lubrication of the second hub member 31 are disposed corresponding to the notches 27 for lubrication of the cylindrical part 23 of the first hub member 21, and can supply the hydraulic fluid for lubrication to the friction plates 50 through the notches 27 for lubrication.

As illustrated in FIG. 14, the supply ports 134 of the boss parts 33 for lubrication incline to the downstream side in the rotating direction of the friction plates 50 (a direction indicated by an arrow 50a) as they go radially outward from the axial oil channels 133. Each supply port 134 inclines with respect to the radial direction of the second hub member 31 (a direction indicated by an arrow 31a) passing through a center axis 33b of the boss part 33 for lubrication, at a given angle θ1 to the downstream side in the rotating direction of the friction plates 50, as indicated by an arrow 134a. The angle θ1 is set larger than 0° and smaller than 90°, and is preferably set within an angle range between 30° and 45°.

Thus, since the hydraulic fluid for lubrication is supplied from the supply ports 134 to the downstream side in the rotating direction of the friction plates 50, a shear resistance of the hydraulic fluid, such as lubricating oil, can be reduced as compared with a case where the hydraulic fluid for lubrication is supplied toward a direction perpendicular to the rotating direction of the friction plates 50, thereby reducing the drag between the friction plates caused by the hydraulic fluid for lubrication.

Figure 17:
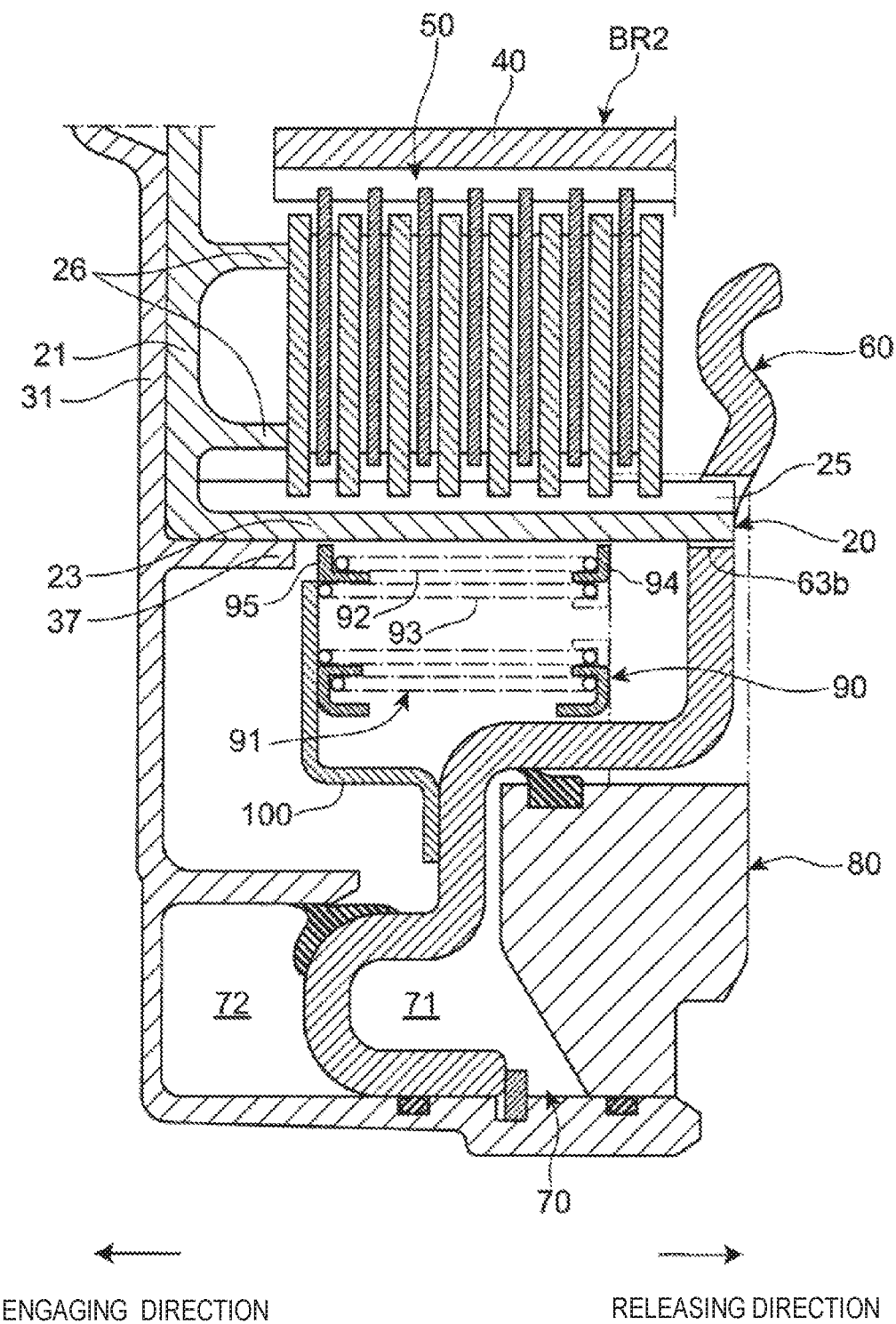
FIG. 17 is a cross-sectional view illustrating the brake in a released state.
Figure 18:
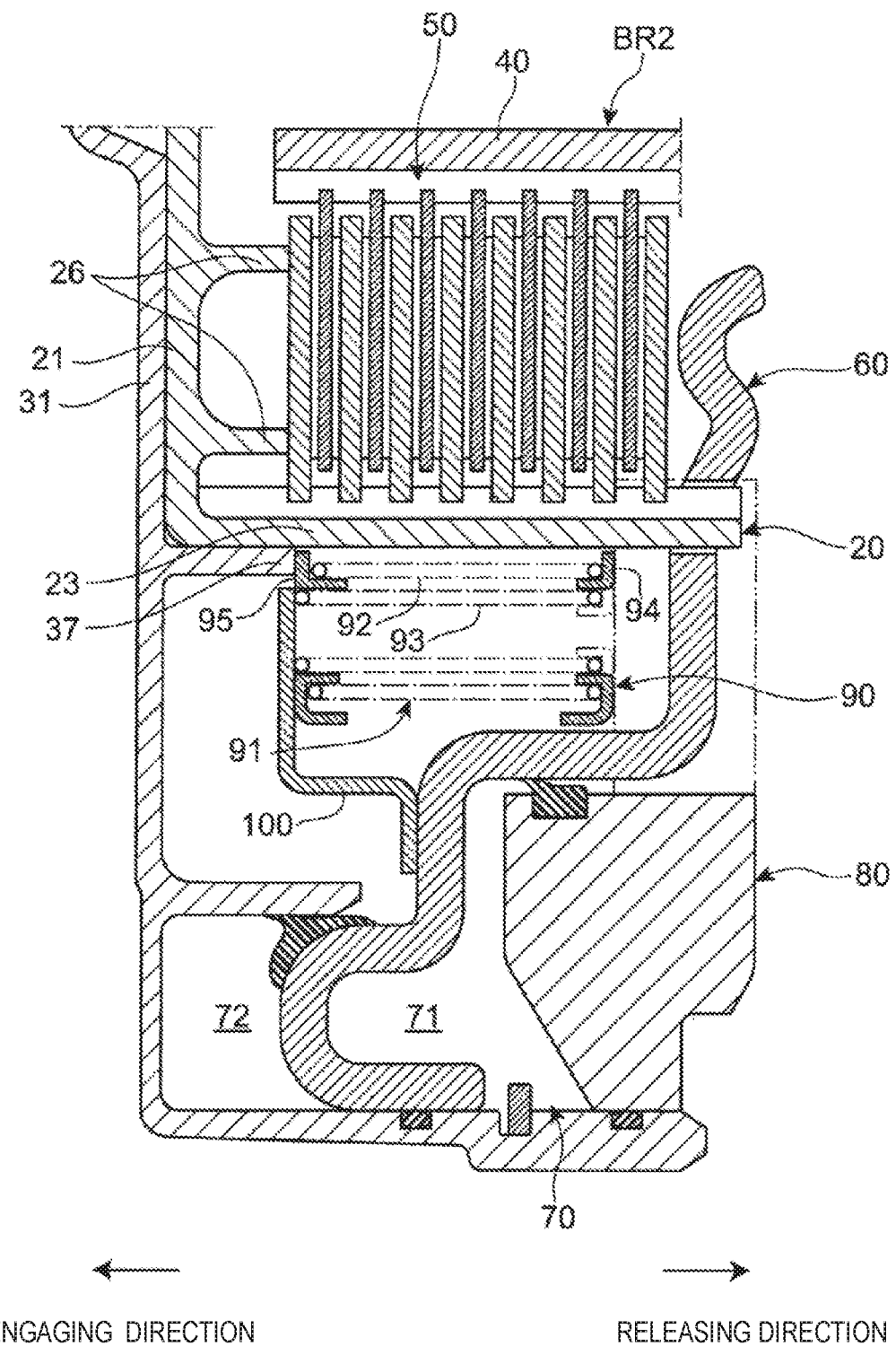
FIG. 18 is a cross-sectional view illustrating the brake in an immediately-before-contact state.
Figure 19:
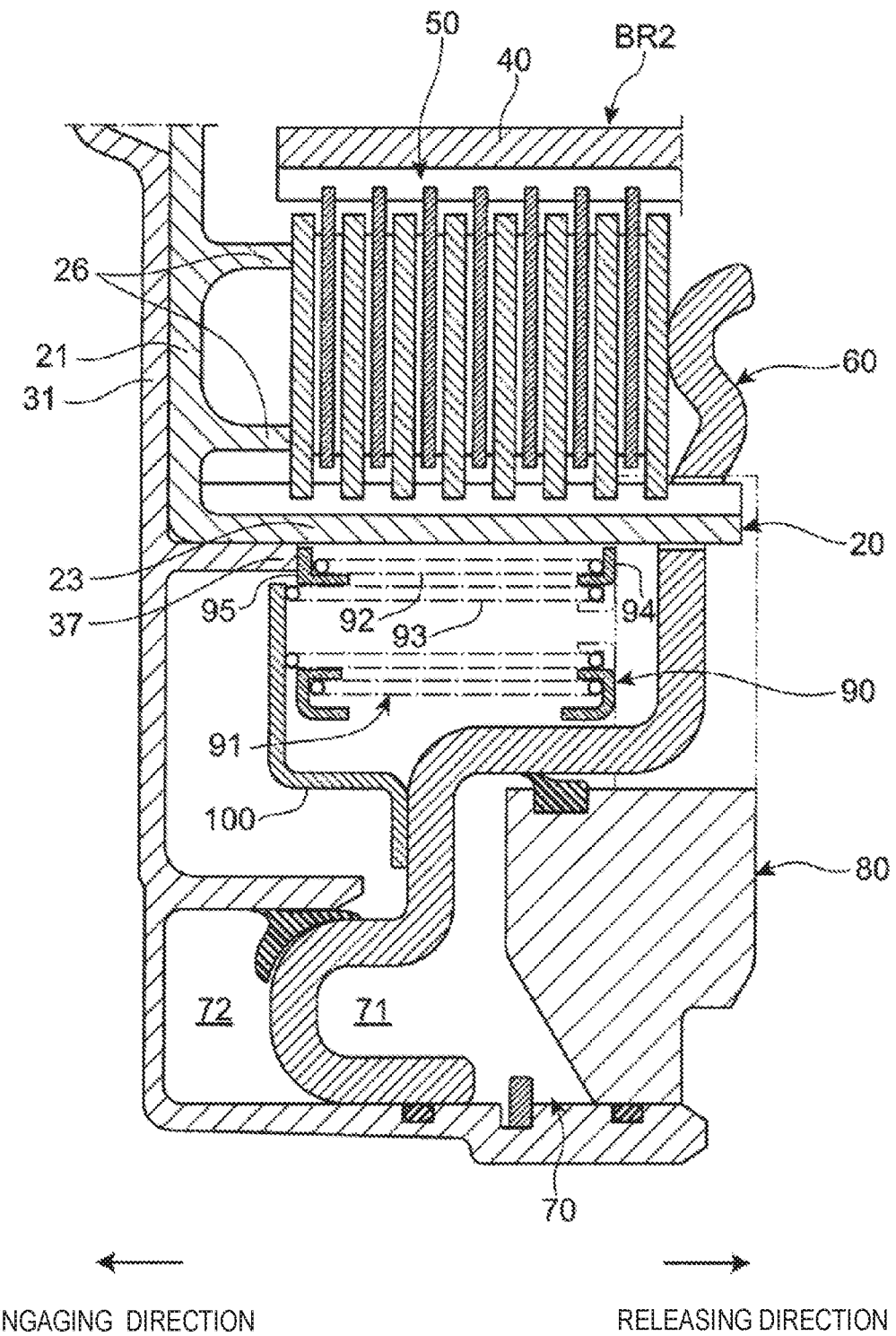
FIG. 19 is a cross-sectional view illustrating the brake in a zero-clearance state.
Figure 20:
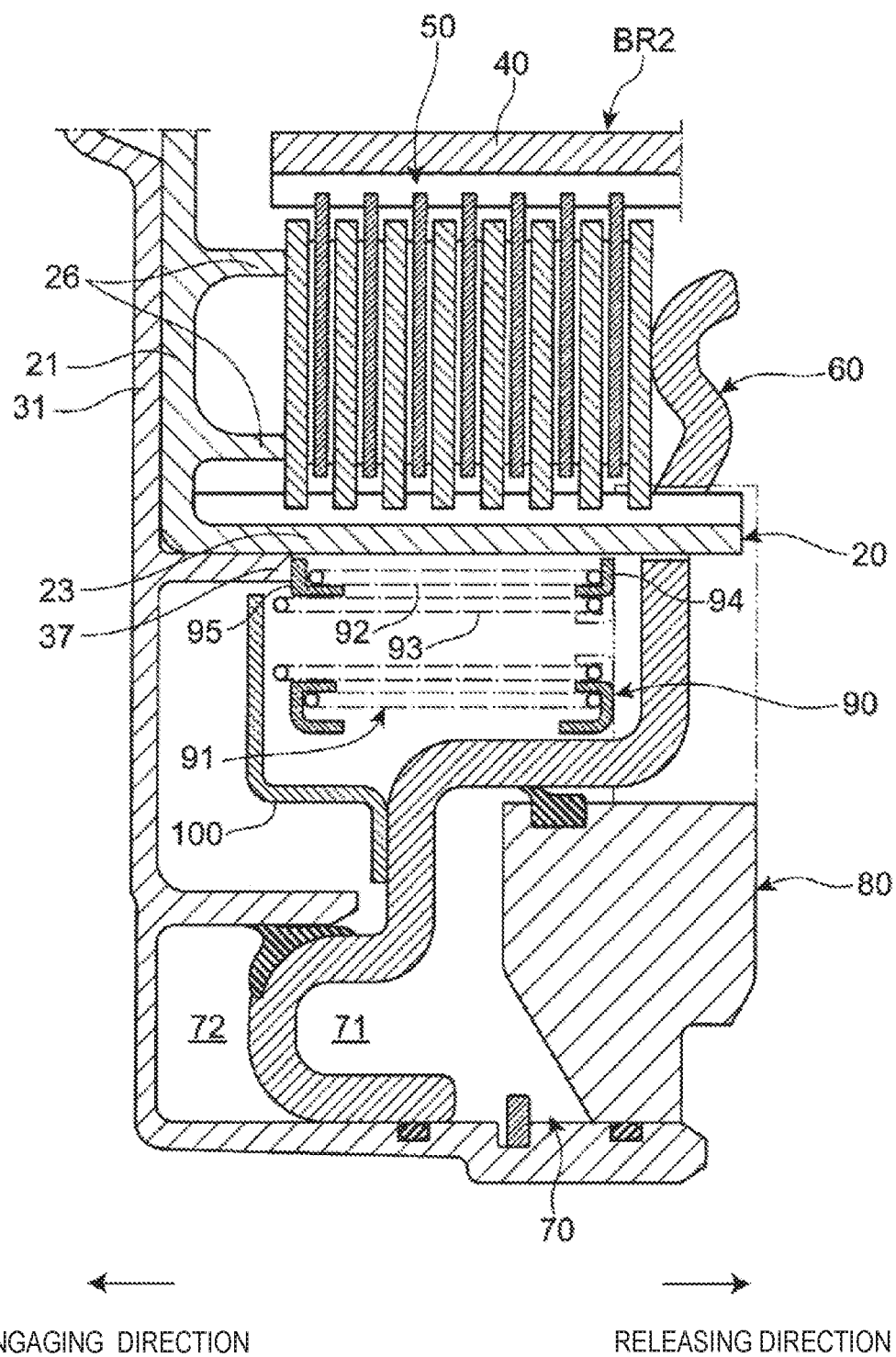
FIG. 20 is a cross-sectional view illustrating the brake in an engaged state.
Figure 21:
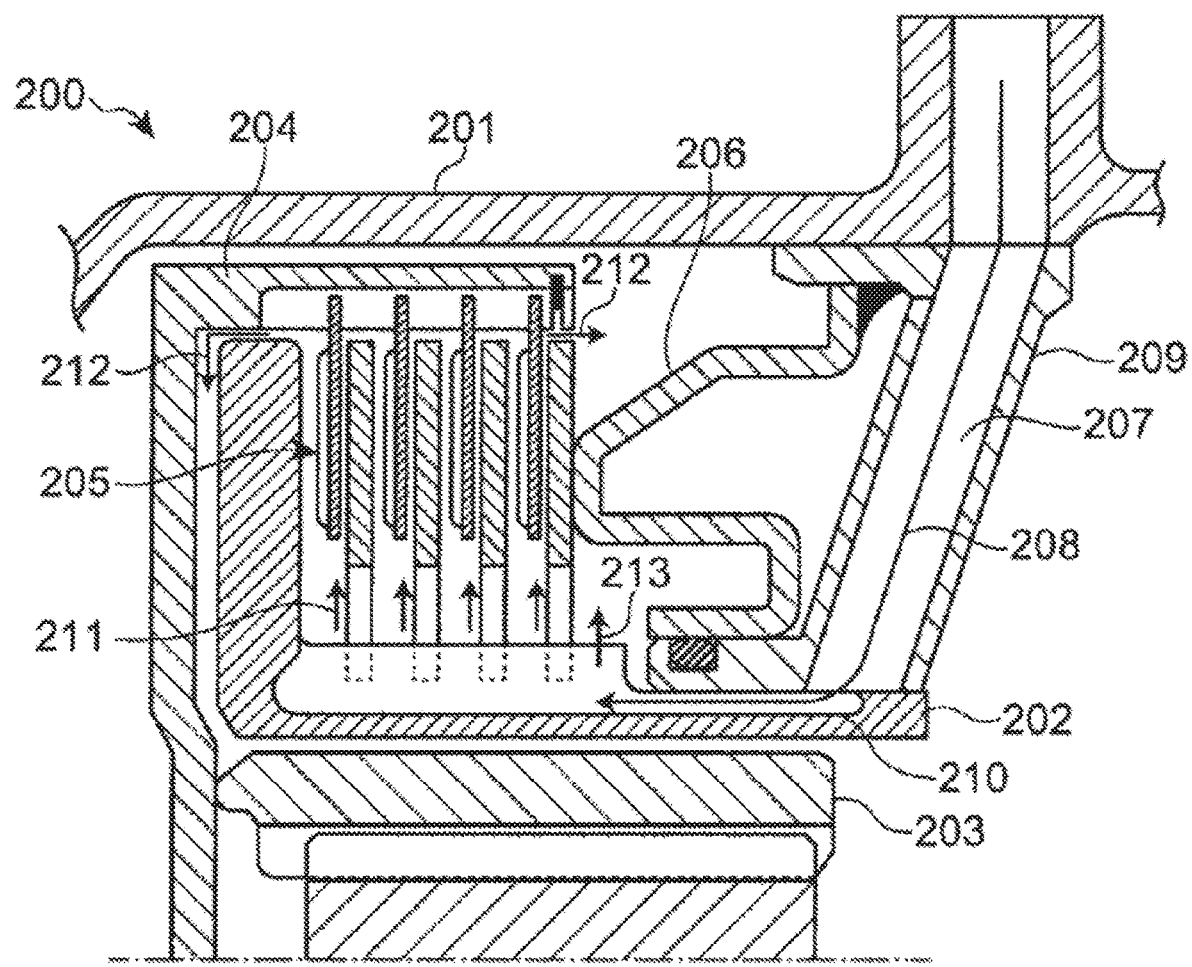
FIG. 21 is a cross-sectional view illustrating a brake of a conventional automatic transmission.

Next, operation of the brake BR2 structured in this way is described. FIG. 17 is a cross-sectional view illustrating the brake in the released state, FIG. 18 is a cross-sectional view illustrating the brake in the immediately-before-contact state, FIG. 19 is a cross-sectional view illustrating the brake in the zero-clearance state, and FIG. 20 is a cross-sectional view illustrating the brake in the engaged state. FIGS. 17 to 20 illustrate enlarged views of a substantial part of the brake BR2 in FIG. 3.

In FIG. 17, as the hydraulic pressure for engagement is discharged from the hydraulic chamber 71 for engagement and the hydraulic pressure for release is supplied to the hydraulic chamber 72 for release, the first springs 92 and the second springs 93 are compressed through the biasing force receiving member 100, and the piston 60 is moved in the releasing direction (i.e., to the anti-driving-source side). FIG. 17 illustrates the released state of the brake BR2 where the piston 60 is located at the released position where the plurality of friction plates 50 are in the released state.

When engaging the brake BR2, the hydraulic pressure for release is discharged from the hydraulic chamber 72 for release in the released state illustrated in FIG. 17. As illustrated in FIG. 18, the piston 60 receives the biasing force of the first springs 92 and the second springs 93 through the biasing force receiving member 100 and is moved in the engaging direction (i.e., the driving-source side) until the second retainer plate 95 contacts the first cylindrical part 37 of the second hub member 31. The piston 60 then reaches the immediately-before-contact position where the piston 60 is about to contact the plurality of friction plates 50, to make the brake BR2 in the immediately-before-contact state.

In this immediately-before-contact state illustrated in FIG. 18, when the second retainer plate 95 contacts the first cylindrical part 37 of the second hub member 31 as illustrated in FIG. 19, the piston 60 receives the biasing force of the second springs 93 through the biasing force receiving member 100 and is moved in the engaging direction until the second springs 93 reach their free lengths. Thus, the piston 60 is located at the zero-clearance position at which the piston 60 becomes in the zero-clearance state where the piston 60 contacts or substantially contacts the friction plates 50 without pressing the plurality of friction plates 50, thereby the brake BR2 becoming in the zero-clearance state.

Then, when the hydraulic pressure for engagement is supplied to the hydraulic chamber 71 for engagement in the zero-clearance state illustrated in FIG. 19, as illustrated in FIG. 20, the piston 60 is biased and moved in the engaging direction by the oil pressure for engagement supplied to the hydraulic chamber 71 for engagement, and the piston 60 is located at the engaged position where the piston 60 pushes the plurality of friction plates 50 and the relative rotation of the plurality of friction plates 50 becomes impossible, thereby the brake BR2 becoming in the engaged state.

On the other hand, when releasing the brake BR2, the hydraulic pressure for engagement is discharged from the hydraulic chamber 71 for engagement in the engaged state illustrated in FIG. 20, and the hydraulic pressure for release is supplied to the hydraulic chamber 72 for release, and then, the piston 60 is biased and moved in the releasing direction (i.e., the anti-driving-source side) by the hydraulic pressure for release supplied to the hydraulic chamber 72 for release, and the piston 60 becomes in the released state illustrated in FIG. 17 via the zero-clearance state illustrated in FIG. 19 and the immediately-before-contact state illustrated in FIG. 18.

In the brake BR2, the piston 60 can be moved with a sufficient response by the first springs 92 and the second springs 93 from the released position to the immediately-before-contact position, and is then moved with sufficient accuracy by the second springs 93 from the immediately-before-contact position to the zero-clearance position.

As described above, the brake BR2 is slip-controlled when the vehicle starts traveling. When engaging the brake BR2, after the hydraulic pressure lower than the oil pressure for engagement is supplied to the hydraulic chamber 71 for engagement to make the plurality of friction plates 50 into the slipping state, the hydraulic pressure for engagement is supplied to the hydraulic chamber 71 for engagement to engage the plurality of friction plates 50. On the other hand, when releasing the brake BR2, after the hydraulic pressure lower than the hydraulic pressure for release is supplied to the hydraulic chamber 72 for release to make the plurality of friction plates 50 into the slipping state, the hydraulic pressure for release is supplied to the hydraulic chamber 72 for release to release or disengage the plurality of friction plates 50.

When engaging and releasing the brake BR2, the hydraulic fluid for lubrication is supplied to the plurality of friction plates 50 through the supply oil channel L1 for lubrication, and when the slip control of the brake BR2 is carried out, the hydraulic fluid for lubrication is supplied to the plurality of friction plates 50 through the supply oil channel L1 for lubrication.

In this embodiment, in the brake BR2 in which the plurality of friction plates 50 are disposed between the hub member 20 coupled to the transmission case 11 and the drum member 40 coupled to the ring gear R3, the hub member 20 includes the first hub member 21 having the cylindrical part 23 provided with the spline parts 25, and is made of ferrous material, and the second hub member 31 having the feed part 33 for lubrication provided with the supply oil channel L1 for lubrication, and is made of the aluminum-based material. The feed part 33 for lubrication of the second hub member 31 supplies the hydraulic fluid for lubrication to the friction plates 50 through the notch 27 for lubrication formed in the cylindrical part 23 of the first hub member 21.

Similar to this, for the other brake and clutch in which a plurality of friction plates are disposed between a hub member and a drum member, the hub member may include a first hub member having a cylindrical part provided with spline parts, and is made of the ferrous material, and a second hub member having a feed part for lubrication provided with a supply oil channel for lubrication, and is made of the aluminum-based material, and the feed part for lubrication of the second hub member may supply the hydraulic fluid for lubrication to the friction plates through a notch for lubrication formed in the cylindrical part of the first hub member.

Thus, the automatic transmission 10 according to this embodiment includes the second brake BR2 where the plurality of friction plates 50 are disposed between the hub member 20 and the drum member 40. The hub member 20 includes the first hub member 21 having the cylindrical part 23 with the spline parts 25 with which the friction plates 50 are spline-engaged and made of ferrous material, and the second hub member 31 having the feed part 33 for lubrication with the supply oil channel L1 for lubrication and made of aluminum-based material. The notch 27 for lubrication is formed in the cylindrical part 23 of the first hub member 21 and the feed part 33 for lubrication of the second hub member 31 supplies the hydraulic fluid for lubrication to the friction plates 50 through the notch 27 for lubrication.

Thus, since the first hub member 21 having the cylindrical part 23 with the spline parts 25 is made of ferrous material, the tooth height of the spline parts 25 can be reduced as compared with the case where the hub member 20 having the cylindrical part 23 with the spline parts 25 and the feed part 33 for lubrication provided with the supply oil channel L1 for lubrication is made of the aluminum-based material, thereby reducing the radial size.

Moreover, since the second hub member 31 having the feed part 33 for lubrication with the supply oil channel L1 for lubrication is made of the aluminum-based material, while supplying the hydraulic fluid for lubrication from the hub member side, the weight can be reduced as compared with the case where the hub member 20 having the cylindrical part 23 with the spline parts 25 and the feed part 33 for lubrication is made of the ferrous material.

Therefore, in the automatic transmission 10 provided with the second brake BR2 where the plurality of friction plates 50 are disposed between the hub member 20 and the drum member 40, the weight and the radial size can be reduced while supplying the hydraulic fluid for lubrication from the hub member side.

Moreover, the friction engaging element is the second brake BR2 where the hub member 20 is coupled to the transmission case 11 and the drum member 40 is coupled to the ring gear R3. Thus, in the automatic transmission 10 provided with the brake BR2 where the plurality of friction plates 50 are disposed between the hub member 20 and the drum member 40, the weight and the radial size can be reduced while supplying the hydraulic fluid for lubrication from the hub member side.

Moreover, the hydraulic chamber 70 to which the hydraulic fluid for biasing the piston 60 is provided, and the supply oil channels L2 and L3 for operation which supply the hydraulic fluid to the hydraulic chamber 70 are provided to the second hub member 31. Thus, since the supply oil channel L1 for lubrication and the supply oil channels L2 and L3 for operation are formed in the second hub member 31, the supply oil channels of the hydraulic fluid can be simplified, as compared with a case where the supply oil channel L1 for lubrication and the supply oil channels L2 and L3 for operation are formed in the first hub member 21 and the second hub member 31.

Moreover, the automatic transmission 10 is coupled to the driving source without the intervening hydraulic power transmission device, and the second brake BR2 is slip-controlled when the vehicle starts traveling and is engaged at the first gear. Thus, in the automatic transmission 10 coupled to the driving source without the intervening hydraulic power transmission device, when the brake BR2 is provided, which is slip-controlled when the vehicle starts traveling and engaged at the first gear, the weight and the radial size can be reduced while supplying the hydraulic fluid for lubrication from the hub member side.

The present disclosure is not intended to be limited to the illustrated embodiment, and various improvements and design changes are possible without departing from the subject matter of the present disclosure.

As described above, according to the present disclosure, in the automatic transmission provided with the friction engaging element where the plurality of friction plates are disposed between the hub member and the drum member, since the weight and the radial size can be reduced while supplying the hydraulic fluid for lubrication from the hub member side, the automatic transmission may suitably be used in the manufacturing field of this kind of automatic transmissions or vehicles to which the automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

10 Automatic Transmission
20 Hub Member
21 First Hub Member
23 Cylindrical Part of First Hub Member
25 Spline Part
27 Notch for Lubrication
31 Second Hub Member
33 Boss Part for Lubrication
40 Drum Member
50 Friction Plate
60 Piston
70 Hydraulic Chamber
BR2 Second Brake
L1 Supply Oil Channel for Lubrication
L2 Supply Oil Channel for Engagement
L3 Supply Oil Channel for Release

What is claimed is:

1. An automatic transmission provided with a friction engaging element having a hub member, a drum member, a plurality of friction plates disposed between the hub member and the drum member, and a piston configured to engage the plurality of friction plates, the hub member comprising:
   a first hub member having a cylindrical part provided with a spline part, and made of a ferrous material, the friction plates being spline-engaged with an outer circumferential part of the spline part; and
   a second hub member disposed at a side part of the first hub member, having a feed part for lubrication provided with a supply oil channel for lubrication configured to supply hydraulic fluid for lubrication to the friction plates from an inner circumferential side, and made of an aluminum-based material,
   wherein a notch for lubrication is formed by circumferentially cutting the cylindrical part of the first hub member corresponding to the feed part for lubrication of the second hub member, and wherein the feed part for lubrication supplies the hydraulic fluid for lubrication to the friction plates through the notch for lubrication.

2. The automatic transmission of claim 1, wherein the friction engaging element is a brake where the hub member is coupled to a transmission case, and the drum member is coupled to a given rotary member.

3. The automatic transmission of claim 1, comprising a hydraulic chamber to which hydraulic fluid for biasing the piston is supplied,
   wherein the second hub member is provided with a supply oil channel for operation configured to supply the hydraulic fluid to the hydraulic chamber.

4. The automatic transmission of 1, wherein the automatic transmission is coupled to a driving source without an intervening hydraulic power transmission device, and
   wherein the friction engaging element is slip-controlled when a vehicle starts traveling, and is engaged at a first gear.

* * * * *